(12) United States Patent
Choi et al.

(10) Patent No.: US 10,685,467 B2
(45) Date of Patent: Jun. 16, 2020

(54) METHOD AND APPARATUS FOR TRANSMITTING AND RECEIVING VIRTUAL REALITY CONTENT

(71) Applicant: Samsung Electronics Co., Ltd., Gyeonggi-do (KR)

(72) Inventors: Byeong-Doo Choi, Gyeonggi-do (KR); Jae-Yun Jeong, Gyeonggi-do (KR); Eric Yip, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/702,387

(22) Filed: Sep. 12, 2017

(65) Prior Publication Data

US 2018/0075635 A1 Mar. 15, 2018

(30) Foreign Application Priority Data

Sep. 12, 2016 (KR) ........................ 10-2016-0117448

(51) Int. Cl.
| | |
|---|---|
| *G06T 11/60* | (2006.01) |
| *H04N 7/18* | (2006.01) |
| *H04N 5/357* | (2011.01) |
| *H04N 13/106* | (2018.01) |
| *H04N 13/204* | (2018.01) |
| *H04N 13/156* | (2018.01) |
| *H04N 13/178* | (2018.01) |

(Continued)

(52) U.S. Cl.
CPC ......... *G06T 11/60* (2013.01); *H04N 5/23238* (2013.01); *H04N 5/3572* (2013.01); *H04N 7/18* (2013.01); *H04N 13/106* (2018.05); *H04N 13/156* (2018.05); *H04N 13/178* (2018.05); *H04N 13/194* (2018.05); *H04N 13/204* (2018.05); *G06T 2200/32* (2013.01); *H04N 5/38* (2013.01)

(58) Field of Classification Search
None
See application file for complete search history.

(56) References Cited

U.S. PATENT DOCUMENTS

| | | | |
|---|---|---|---|
| 6,044,181 A | 3/2000 | Szeliski et al. | |
| 6,157,747 A | 12/2000 | Szeliski et al. | |

(Continued)

FOREIGN PATENT DOCUMENTS

WO    WO 2009/039512    3/2009

OTHER PUBLICATIONS

International Search Report dated Dec. 19, 2017 issued in counterpart application No. PCT/KR2017/009995, 12 pages.

(Continued)

*Primary Examiner* — William C Vaughn, Jr.
*Assistant Examiner* — Joseph Daniel A Towe
(74) *Attorney, Agent, or Firm* — The Farrell Law Firm, P.C.

(57) ABSTRACT

A method for transmitting virtual reality (VR) content by a device is provided. The method includes obtaining at least two images captured from a target, arranging the at least two images and projecting the at least two images onto a planar surface to configure a 360-degree image corresponding to the VR content, detecting an overlapped region of the at least two images projected and generating rearrangement information about the overlapped region, and transmitting the rearrangement information and the at least two images.

20 Claims, 17 Drawing Sheets

(51) Int. Cl.
*H04N 13/194* (2018.01)
*H04N 5/232* (2006.01)
*H04N 5/38* (2006.01)

(56) References Cited

U.S. PATENT DOCUMENTS

| | | | |
|---|---|---|---|
| 2004/0257384 A1* | 12/2004 | Park | H04N 5/232 |
| | | | 345/646 |
| 2005/0226531 A1 | 10/2005 | Silverstein et al. | |
| 2013/0243351 A1 | 9/2013 | Feng et al. | |
| 2015/0293592 A1* | 10/2015 | Cheong | G06F 3/016 |
| | | | 345/173 |
| 2015/0358539 A1* | 12/2015 | Catt | G06T 7/593 |
| | | | 348/38 |
| 2016/0142644 A1* | 5/2016 | Lin | H04N 5/23238 |
| | | | 348/143 |
| 2016/0212338 A1* | 7/2016 | Seok | G06T 3/4038 |
| 2017/0339392 A1* | 11/2017 | Forutanpour | H04N 19/597 |

OTHER PUBLICATIONS

European Search Report dated Jul. 19, 2019 issued in counterpart application No. 17849172.6-1208, 7 pages.

* cited by examiner

METHOD AND APPARATUS FOR TRANSMITTING AND RECEIVING VIRTUAL REALITY CONTENT

PRIORITY

This application claims priority under 35 U.S.C. § 119(a) to a Korean Patent Application filed on Sep. 12, 2016 in the Korean Intellectual Property Office and assigned Ser. No. 10-2016-0117448, the entire disclosure of which is incorporated herein by reference.

BACKGROUND

1. Field of the Disclosure

The present disclosure relates generally to methods and apparatuses for transmitting and receiving virtual reality (VR) content, and more particularly, to a method and apparatus for configuring pieces of information for rendering images constituting VR content free of distortion and signaling with the information.

2. Description of the Related Art

The Internet is evolving from a human-centered connection network by which humans create and consume information to an Internet of Things (IoT) network by which information is communicated and processed between things or other distributed components. Internet of Everything (IoE) technology may be an example of a combination of Big data processing technology and IoT technology through, e.g., a connection with a cloud server.

To implement the IoT, technology elements, such as a sensing technology, wired/wireless communication and network infrastructure, service interface technology, and a security technology are required. Research is ongoing for inter-object connection technologies, such as a sensor network, machine-to-machine (M2M) communication, and machine-type communication (MTC).

The IoT environment may offer intelligent internet technology (IT) services that collect and analyze data generated by things connected with one another to add new value to the human experience. The IoT may have various applications, such as a smart home, a smart building, a smart city, a smart car or a connected car, a smart grid, health-care, or the smart appliance industry, or state-of-the-art medical services through the convergence or integration of existing IT technologies and various industries. In addition, contents for implementing the IoT are also evolving. In other words, as black-and-white content shifts to color content, and high definition (HD), ultra-high definition (UHD), and recent high dynamic range (HDR) content are standardized and spread, research is underway for VR content that may be played by VR apparatuses, such as the Oculus or Samsung Gear VR. A VR system monitors a user and allows the user to enter feedback through a content display device or processing unit using a certain type of controller. The device or unit processes the entered feedback to adjust the content to fit the same, enabling interactions.

A VR echo system may include basic components, e.g., a head mounted display (HMD), a wireless/mobile VR system, TVs, cave automatic virtual environments (CAVEs), peripherals, and haptics (other controllers for providing inputs to a VR system), content capture (camera or video stitching), a content studio (game, stream, movie, news, and documentary), industrial applications (education, health-care, real property, construction, travel), productivity tools and services (three-dimensional (3D) engines, processing power), and application (app) stores (for VR media content).

Capturing, encoding, and transmission of 360-degree image content which are performed to configure VR content encounter myriad challenges without implementing a post-high efficiency video coding (HEVC) codec that may be designed for 3D 360-degree content.

Thus, a need exists for a scheme capable of configuration and consumption of VR content in a more efficient way.

SUMMARY

An aspect of the present disclosure provides a method and apparatus for transmitting and receiving VR content.

Another aspect of the present disclosure provides a method and apparatus for configuring pieces of information for rendering images constituting VR content free of distortion and signaling with the information.

Another aspect of the present disclosure provides a method and apparatus for playing VR content based on the signaling information of the VR content on the receiver.

According to an aspect of the present disclosure, a method for transmitting virtual reality (VR) is provided. The method includes obtaining at least two images captured from a target, arranging the at least two images and projecting the at least two images onto a planar surface to configure a 360-degree image corresponding to the VR content, detecting an overlapped region of the at least two images projected and generating rearrangement information about the overlapped region, and transmitting the rearrangement information and the at least two images.

According to another aspect of the present disclosure, a method for receiving VR content is provided. The method includes receiving the VR content, obtaining at least two images captured from a target and rearrangement information from the VR content, and rendering a 360-degree image corresponding to the VR content by rearranging an overlapped region of the at least two images projected onto a planar surface based on the rearranged information.

According to another aspect of the present disclosure, a device for transmitting VR content is provided. The device includes a camera unit configured to obtain at least two images captured from a target, a controller configured to arrange the at least two images and project the at least two images onto a planar surface to configure a 360-degree image corresponding to the VR content, detect an overlapped region of the at least two images projected, and generate rearrangement information about the overlapped region, and a transceiver configured to transmit the rearrangement information and the at least two images.

According to another aspect of the present disclosure, a device for receiving VR content is provided. The device includes a transceiver configured to receive the VR content, a controller configured to obtain at least two images captured from a target and rearrangement information from the VR content, and a display configured to render a 360-degree image corresponding to the VR content by rearranging an overlapped region of the at least two images projected onto a planar surface based on the rearranged information according to an instruction from the controller.

BRIEF DESCRIPTION OF THE DRAWINGS

The above and other aspects, features, and advantages of the present disclosure will be more apparent from the following detailed description, taken in conjunction with the accompanying drawings, wherein.

DETAILED DESCRIPTION OF EMBODIMENTS OF THE PRESENT DISCLOSURE

Figure 1:
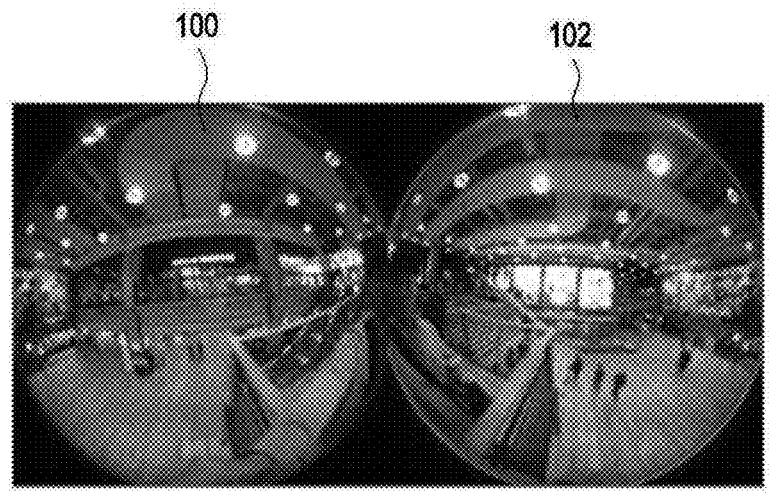
FIG. 1 is a photograph of an image captured through a normal fisheye camera.

Hereinafter, embodiments of the present disclosure are described in detail with reference to the accompanying drawings. The same reference numerals are used to refer to same elements throughout the accompanying drawings. When it is determined that it would make the subject matter of the present disclosure unclear, details of known functions or configurations may be omitted. Terms used herein are defined considering functions in the present disclosure but may be replaced with other terms according to an intention or practice of a user or an operator. Therefore, the terms are intended to be defined based on the entirety of the present disclosure.

Various changes may be made to an embodiment of the present disclosure, and the present disclosure may come with a diversity of embodiments. Some embodiments of the present disclosure are shown and described in connection with the accompanying drawings. However, it should be appreciated that the present disclosure is not limited to the embodiments, and all changes and/or equivalents or replacements are intended to be included in the scope of the present disclosure as defined by the appended claims.

Certain terms or phrases used herein may be defined merely for ease of description. As used herein, the terms "include" and "comprise" and their derivatives may indicate doing so without any limitations. As used herein, the term "or" may be used interchangeably with the term "and/or." As used herein, the phrases "associated with," "associated therewith" and their derivatives may be used interchangeably with the terms "include," "be included within," "interconnect with," "contain," "be contained within," "connect to or with," "couple to or with," "be communicable with," "cooperate with," "interleave," "juxtapose," "be proximate to, "be bound to or with, "have, and "have a property of." As used herein, the term "controller" may indicate any device, system, or part thereof controlling at least one operation. As used herein, the term "device" may indicate a device that may be implemented in hardware, firmware, software, and some combination of at least two thereof. It should be noted that functions, whatever certain controller is associated therewith, may be concentrated, distributed, and implemented locally or remotely. It should be appreciated by one of ordinary skill in the art that the definitions of certain terms or phrases as used herein may be adopted for the present or the future in many cases.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as "first" and "second" may be used to denote various components, but the components are not intended to be limited by the terms. The terms are used only to distinguish one component from another. For example, a first component may be referred to as a second component, and vice versa without departing from the scope of the present disclosure. The term "and/or" may refer to a combination(s) of a plurality of related items as listed or any of the items.

The terms as used herein are provided merely to describe embodiments of the present disclosure, but are not intended to limit the present disclosure. It will be further understood that the terms "comprise" and/or "have," when used in the present disclosure, indicate the presence of stated features, integers, steps, operations, elements, and/or components, but do not preclude the presence or addition of one or more other features, integers, steps, operations, elements, components, and/or groups thereof.

Unless otherwise defined in connection with an embodiment of the present disclosure, all terms used herein have the same meaning as commonly understood by one of ordinary skill in the art to which an embodiment of the present disclosure belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

According to an embodiment of the present disclosure, an electronic device as disclosed herein may include a communication function. For example, the electronic device may be a smartphone, a tablet personal computer (PC), a PC, a mobile phone, a video phone, an electronic book (e-book) reader, a desktop PC, a laptop PC, a netbook PC, a personal digital assistant (PDA), a portable multimedia player (PMP), a moving picture experts group audio layer 3 (MP3) player, a mobile medical device, a camera, a wearable device (e.g., an HMD), electronic clothes, an electronic bracelet, an electronic necklace, an electronic appcessory, an electronic tattoo, or a smart watch.

According to an embodiment of the present disclosure, an electronic device may be a smart home appliance with a communication function. For example, the smart home appliance may be a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync®, Apple TV®, or Google TV™), a gaming console, an electronic dictionary, a camcorder, or an electronic picture frame.

According to an embodiment of the present disclosure, an electronic device may be a medical device (e.g., a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an electronic device for sailing (e.g., a navigation device, a gyroscope, or a compass), an aviation electronic device, a security device, or a robot for home or industry.

According to an embodiment of the present disclosure, an electronic device may be a piece of furniture with a communication function, part of a building/structure, an electronic board, an electronic signature receiving device, a projector, or various measurement devices (e.g., devices for measuring water, electricity, gas, or electromagnetic waves).

According to an embodiment of the present disclosure, an electronic device may be a combination of the above-listed devices. It should be appreciated by one of ordinary skill in the art that an electronic device is not limited to the above-described devices.

According to an embodiment of the present disclosure, a device for transmitting and receiving VR content may be, e.g., an electronic device.

The terms as used herein are defined as follows. An image may be a video or a still image. Image content may include various multimedia content including audio or a subtitle, but not a video or a still image by itself. VR content includes image content that provides an image as a 360-degree image or a 3D image. Media file format may be a media file format that follows various media-related standards, such as an International Standards Organization (ISO)-based media file format (ISOBMFF). Projection indicates a process for projecting a spherical image for representing, e.g., a 360-degree image onto a planar surface or an image frame obtained as per a result of the process. Mapping indicates a process for mapping image data on a planar surface by projection to a two-dimensional (2D) planar surface or an image frame obtained as per a result of the process. Omnidirectional media includes an image or video that may be rendered as per a user's viewport or a direction in which the user's head moves, e.g., when the user uses an HMD and/or its related audio. A viewport may be referred to as a field of view (FOV), indicating a region of an image viewed by a user at a certain view point (here, the region of the image may be the region of a spherical image). Additionally, viewport may be defined by using a FOV and a viewpoint. Herein, FOV may be defined as including both a horizontal view angle and a vertical view angle, and a viewport may be an FOV area of an image corresponding to a certain viewpoint.

The operation of a transceiver is now described, taking VR content as an example of omnidirectional media for ease of description.

To configure VR content, a device is used which is equipped with at least two lenses or a camera unit with the at least two lenses that may cover a target scene of 360 degrees. A fisheye camera is in wide use. A transmitter (e.g., a transmitting device, a transmission unit, and a sending entity) is a device equipped with a fisheye camera unit. According to an embodiment of the present disclosure, a transmitter may be configured separately from a camera unit-equipped device to operate in communication with a separate device according to an embodiment of the present disclosure.

FIG. 1 is a photograph of an image captured by a fisheye camera.

Referring to FIG. 1, spherical images which are individually captured by each of two lenses provided in the fisheye camera are projected in circles 100 and 120 on a planar surface, for example. In this case, each of the circular images 100 and 120 include all of the pixels captured by their respective corresponding lenses.

Generally, a system using a fisheye camera aligns and stitches images captured by the lenses in the fisheye camera and projects and maps them onto a 2D planar surface to configure a 360-degree image. The projected images are mapped into a single frame, encoded, and then delivered to a receiver. Upon receiving an encoded image, a receiver (a receiving device, a reception unit, a receiving entity) decodes the encoded image into a video bit stream by a direct mapping scheme but without using an intermediate projection map, such as an equi-rectangular or cube map and directly renders a part of the projected image, which corresponds to a current FOV. Rendering indicates a process of displaying a decoded image. FOV is defined as a spherical region that is shown exclusively to a user at a particular time.

For a receiver to correctly render an encoded images into a 360-degree image, a transmitter must send the receiver information for describing a format of the corresponding VR content. Typically, two types of lens correction parameters are used as such information. The first type of lens correction parameters is a scheme to represent a value for distortion/correction on a decoded image as a polynomial equation. The second type of lens correction parameters is a scheme to represent multiple FOVs for a decoded image as a compression curve for association with multi-circular images. The two types of lens correction parameters are advantageous in allowing a receiver to configure information for decoding VR content with only some parameters. The types of lens correction parameters, however, suffer from the shortcoming that they have difficulty in expressing local variations for a particular angle because an input parameter for determining a value for distortion/correction is a radius of a circular image.

Where images captured by fisheye lenses are transmitted along with a polynomial equation expression or delivered and rendered in a compression curve, all the captured images are assumed to have the same depth value. In this case, configuring a 360-degree image by stitching the captured images would present no misalignment or distortion around the stitched region. In this case, the depth value indicates the distance between the camera or fisheye lens and the object.

However, the depth value of an object region included in each of the images, which is actually captured, substantially differs from the depth of the background. In this case, the background is defined as a region having a depth value not less than a predetermined threshold in the captured images, and the background refers to a portion that is shown unchanged in the captured images.

Accordingly, upon aligning or stitching captured images through multiple lenses or cameras to configure a 360-degree image, a misalignment or distortion may occur around the stitched region.

Figure 2A:
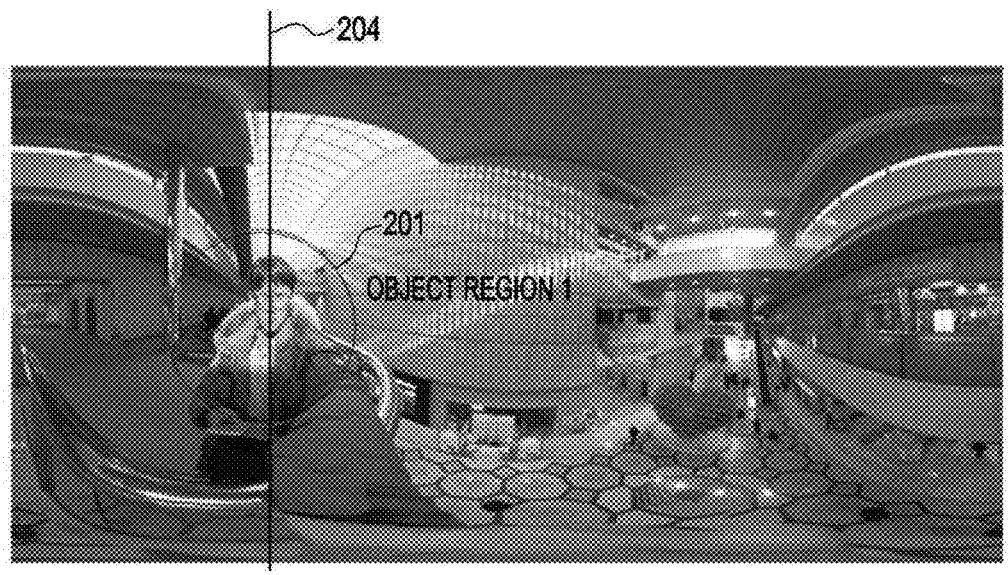
FIGS. 2A and 2B are photographs of configuring VR content by stitching images captured by a camera with at least two lenses provided in a device according to an embodiment of the present disclosure.
Figure 2B:
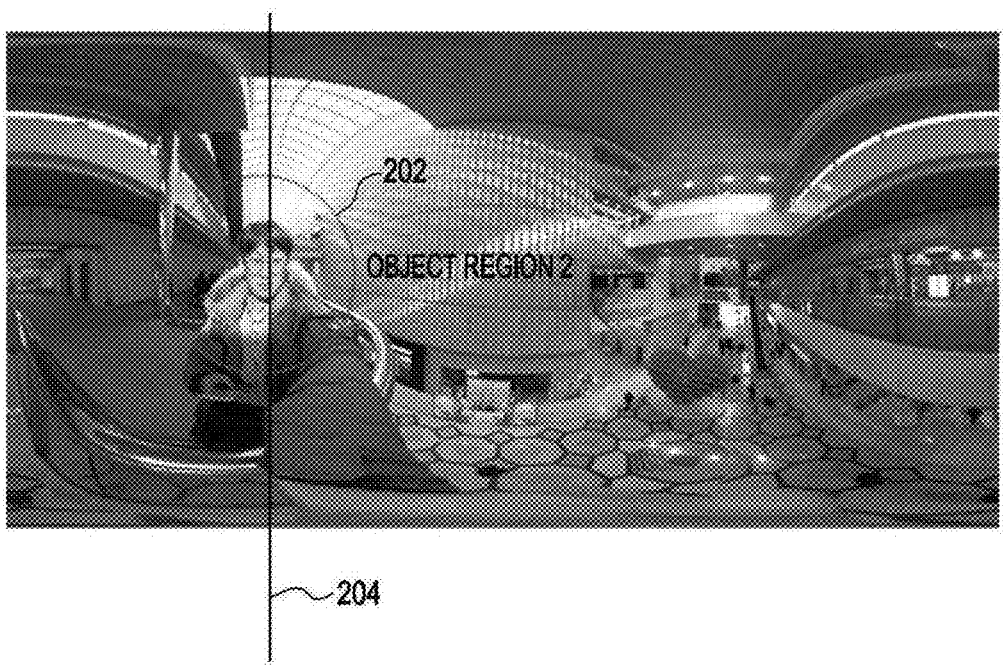

FIGS. 2A and 2B are photographs of configuring a 360-degree image by stitching images captured by a camera with at least two lenses provided in a device according to an embodiment of the present disclosure.

Referring to FIG. 2A, although no distortion occurs in the background based on reference numeral 204, an object region 1 in the captured images is distorted by an overlap between an object included in the image captured by the left-hand one of the two lenses and an object included in the image captured by the right-hand one of the two lenses. This happens because of a difference in distances between the two lenses and the object, i.e., depth values.

Described in this embodiment of the present disclosure is a scheme for removing the distortion of the overlapped region by detecting the overlapped region of the images constituting the 360-degree image and adjusting the arrangement or size of the overlapped region based on the distance between the object and each of the lenses used to capture the images constituting the 360-degree image. Specifically, a transmitter configures parameters for adjusting the arrangement or size of the overlapped region and transmits the parameters along with the captured images. A receiver then receives the parameters and the captured images and adjusts the arrangement or size of the overlapped region of the captured images based on the parameters, rendering a distortion-free 360-degree image.

In an embodiment of the present disclosure, a weight is applied to a compression curve that represents correction parameters of the overlapped region as an example of the parameters, and heterogeneous stretching is performed on each local region of the 360-degree image corresponding to the VR content, thereby compensating for the distorted image. In this case, stretching, as an image processing technique, is a scheme that evenly distributes pixels corresponding to an image on a histogram that represents the pixels.

Figure 3:
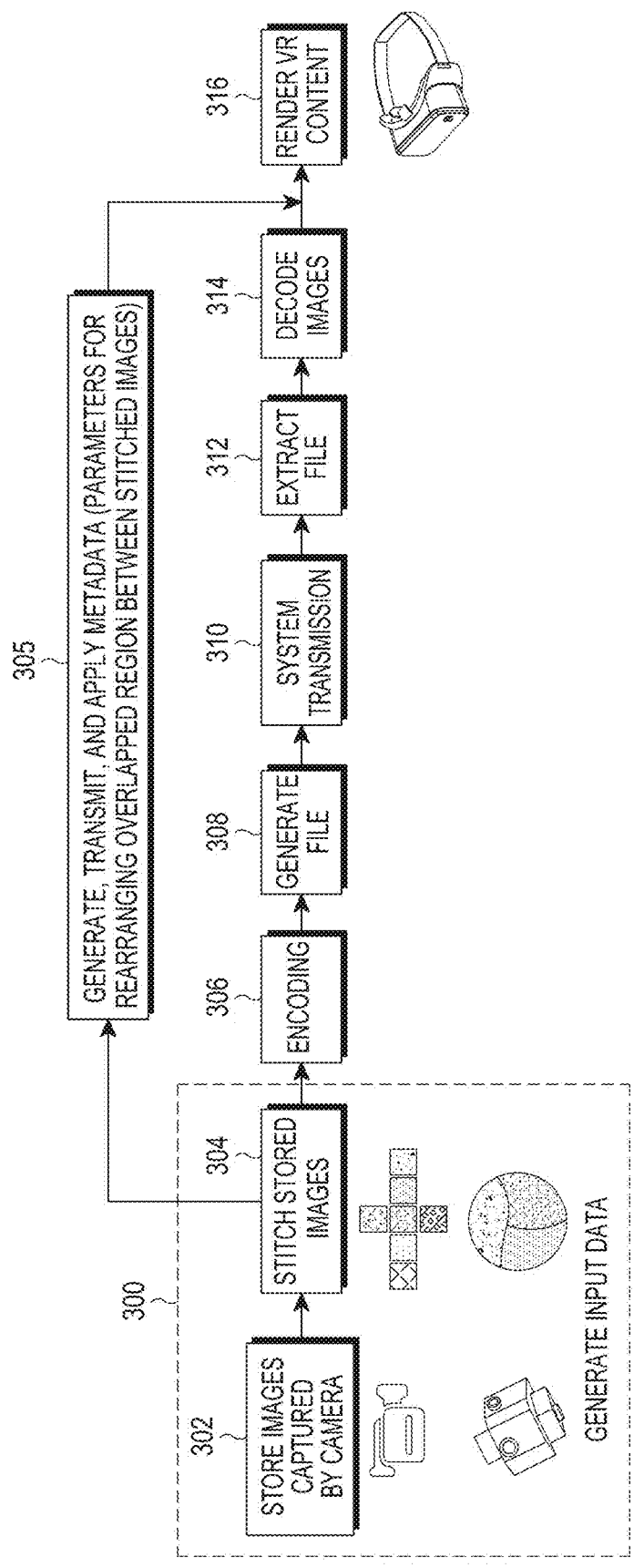
FIG. 3 is a flowchart of a method of transmitting and receiving VR content according to an embodiment of the present disclosure.

FIG. 3 is a flowchart of an operation of transmitting and receiving VR content according to an embodiment of the present disclosure.

Referring to FIG. 3, a transmitter generates input data of VR content in step 300. In this case, the transmitter is assumed to be an electronic device with at least two fisheye lenses or cameras. According to an embodiment of the present disclosure, generating the input data includes capturing images through the at least two lenses or cameras and storing the captured images to configure a target scene of the VR content at 360 degrees in step 302. In step 304, the stored images may be arranged or stitched using a direct mapping scheme as described above to configure the stored images at 360 degrees and may then be projected onto a 2D planar surface. The projected images may be mapped to a single frame. In step 305, the overlapped region of the stitched images may be detected, and parameters may be generated to remove a distortion that arises in the detected region. For example, the parameters for compensating for the distortion in the detected region may be transmitted in metadata of the VR content, according to an embodiment of the present disclosure. However, the configuration in which the parameters are included in the metadata is merely an example. The parameters may be transmitted in other ways. For example, methods for formatting or transmitting the parameters may apply. The transmitter may perform encoding to encapsulate the metadata and the configured frame into a file in steps 306 and 308, respectively, and the transmitter may transmit the encoded file in step 310. The metadata may be transmitted to the receiver as separate information from the file.

In step 312, the receiver may de-encapsulate the file into the frame and the metadata. In step 314, the receiver may decode the images and metadata obtained from the frame to recover the input data. According to an embodiment of the present disclosure, the receiver may also obtain the metadata which is sent from the transmitter separately from the input data. In step 316, the receiver may obtain images corresponding to the input data based on the obtained metadata, stitch the stored images, and rearrange the overlapped region between the stitched images based on the parameters obtained from the metadata, thereby rendering the distortion-free VR content. Encoding/decoding may also be applied to various standards, e.g., ISOBMFF, dynamic adaptive streaming over HTTP (DASH), omnidirectional media format (OMAF), or other standards capable of processing applications or techniques for enabling VR content.

Figure 4A:
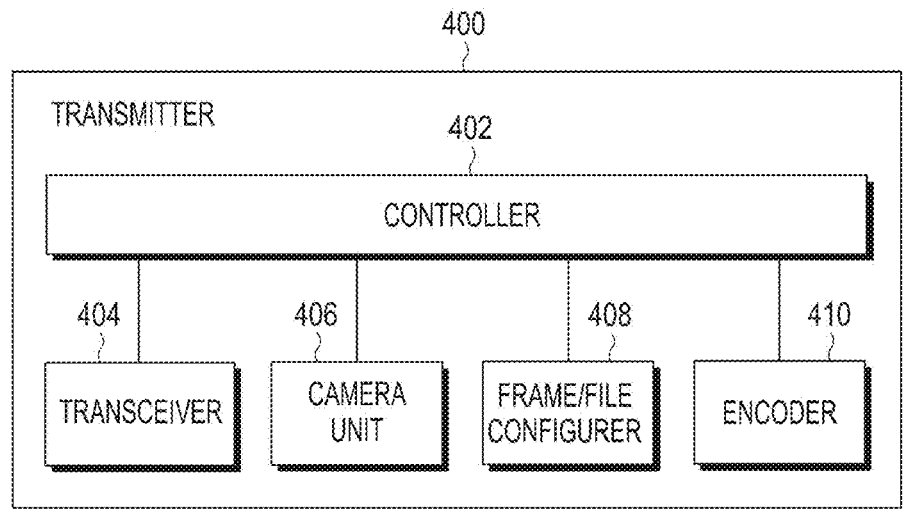
FIG. 4A is a block diagram of a transmitter according to an embodiment of the present disclosure.
Figure 4B:
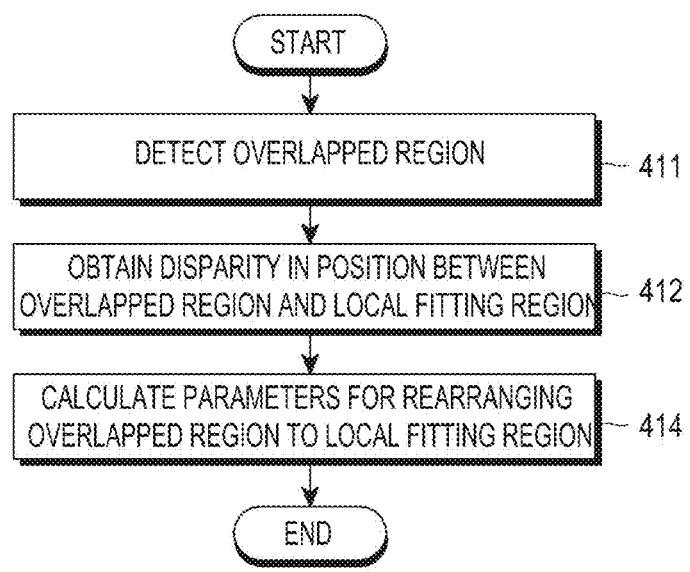
FIG. 4B is a flowchart of a method of a controller of a transmitter according to an embodiment of the present disclosure.

Described below with reference to FIGS. 4A and 4B are a method and apparatus for configuring signaling information and transmitting the signaling information and VR content so that a 360-degree image included in VR content from a transmitter can be rendered without distortion by a receiver.

FIG. 4A is a block diagram of a transmitter 400 according to an embodiment of the present disclosure.

Referring to FIG. 4A, the transmitter 400 may include, e.g., a controller 402, a transceiver 404, a camera unit 406 including at least two lenses, a frame/file configurer 408, and an encoder 410.

The camera unit 406 captures images for configuring a target scene into a 360-degree image and stores the images. Although FIG. 4A illustrates that the transmitter 400 and the camera unit 406 are formed in a single body for ease of description, the camera unit 406 may also be configured as a separate device from the transmitter 400.

The controller 402 arranges or stitches at least two images obtained from the camera unit 406 and projects and maps them to configure a 360-degree image. In this case, since spherical images of the at least two images each have a different depth value, part of the object may be distorted in an overlapped region due to the arrangement or stitching as described above in connection with FIG. 2A. To remove such distortion, the controller 402 may be operated as shown in FIG. 4B described below according to an embodiment of the present disclosure.

FIG. 4B is a flowchart of operations of a controller of a transmitter according to an embodiment of the present disclosure.

Referring to FIG. 4B, the controller 402 detects an overlapped region of the arranged or stitched images in step 411.

Figure 5A:
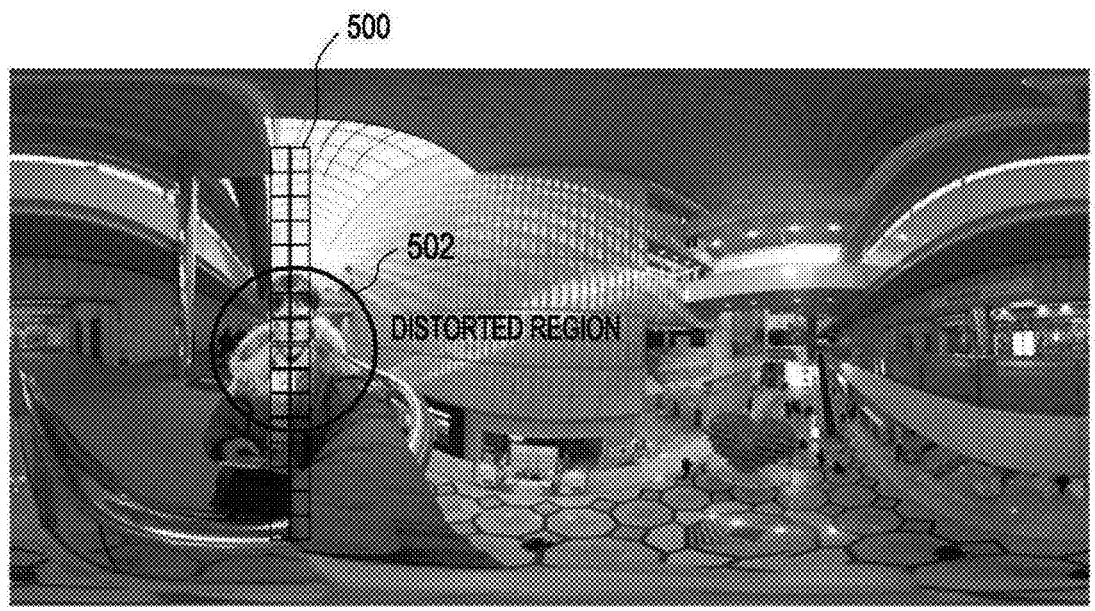
FIG. 5A is a photograph of configuring a 360-degree image of VR content with at least two captured images by stitching, projecting, and mapping the images to a two-dimensional (2D) plane.

FIG. 5A is a photograph of configuring a 360-degree image of VR content with at least two captured images by stitching, projecting, and mapping the images to a two-dimensional (2D) plane.

Referring to FIG. 5A, the controller 402 may compare pixels 500 in an overlapped region where two images are positioned adjacent to each other and identify that discontinuous pixels are distorted. In this case, as an example of a metric for determining the discontinuous pixels, a value obtained by using a square of a difference value between the adjacent pixels may be used.

Figure 5B:
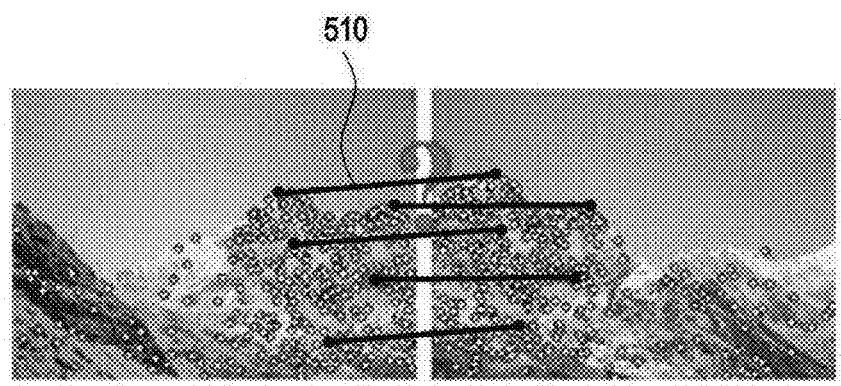
FIG. 5B is a photograph of a scheme for detecting distortion from two stitched images according to an embodiment of the present disclosure.

FIG. 5B is a photograph of a scheme for detecting distortion from two stitched images according to an embodiment of the present disclosure.

Referring to FIG. 5B, a distortion may be identified by detecting points that should directly be connected together, i.e., the same feature portions 510, in the two stitched images. The reason why a distortion occurs as shown in FIGS. 5A and 5B is that the difference in depth value between the background and the object constituting the images actually captured causes the points, which must be directly connected together in the images, to be arranged in different positions, i.e., in positions partially overlapping or departing from each other, during the course of arranging the two images on a 2D planar surface.

In step 412 in FIG. 4B, the controller 402 may calculate a disparity between the position of the overlapped region and the local fitting region where they are supposed to be positioned to remove the distortion in the detected region. In step 414, the controller 402 may determine whether a scheme requested to place the overlapped region in the local fitting region based on the disparity in position is, e.g., stretching or warping, and control the frame/file configurer 408 to calculate parameter values to place the overlapped region in the local fitting region according to the determined scheme. The parameters are described below in detail with reference to Table 1. In this case, warping is a sort of geometric transformation, e.g., a technique for allowing a current position of pixels constituting an overlapped region to correspond to a designated position, i.e., pixels constituting a local fitting region. According to an embodiment of the present disclosure, the controller 402 may substitute a depth value for the disparity in position between the overlapped region and the local fitting region. When the transmitter 400 has a camera capable of measuring depth value, it may obtain the depth value of the overlapped region without a separate calculation. When the transmitter 400 has no capability for measuring depth value, it may search overlapped regions from the stitched images with respect to a particular point. The transmitter 400 may include a gyro sensor. In this case, rather than detecting the overlapped region per frame, the gyro sensor may be used to sense a global camera motion or to perform global motion estimation, and the overlapped region detected in a reference frame may be updated based on the results of the sensing or estimation. Global motion-related information may be transmitted in the metadata of the VR content so that the receiver may update the overlapped region.

According to an embodiment of the present disclosure, the parameters generated by the frame/file configurer 408 to rearrange the overlapped region to the local fitting region may be configured in the signaling information for the VR content to be transmitted, i.e., the metadata. The signaling information may be used to indicate the format of the VR content or may be used to render the VR content on the receiver. For example, the signaling information may be formatted as shown in Table 1 below.

TABLE 1

```
aligned(8) class fisheye_video_info( ) {
    bit(24) reserved = 0;
    unsigned int(8) num_circular_images;
    for(i=0; i< num_circle_images; i++) {
        unsigned int(32) image_center_x;
        unsigned int(32) image_center_y;
        unsigned int(32) full_radius;
        unsigned int(32) frame_radius;
        unsigned int(32) scene_radius;
        unsigned int(32) image_rotation;
        bit(30) reserved = 0;
        unsigned int(2) image_flip;
        unsigned int(32) image_scale_axis_angle;
        unsigned int(32) image_scale_x;
        unsigned int(32) image_scale_y;
        unsigned int(32) field_of_view;
        unsigned int(32) displayed_fov;
        unsigned int(32) overlapped_fov;
        unsigned int(16) image_center_yaw;
        unsigned int(16) image_center_pitch;
        unsigned int(16) image_center_roll;
        bit(16) reserved = 0;
        unsigned int(16) num_compression_curve_pionts;
        for(j=0; j< num_compression_curve_pionts; j++) {
            unsigned int(32) compression_curve_x;
            unsigned int(32) compression_curve_y;
        }
        unsigned int (16) local_fov_weight_type;
        unsigned int (16) num_local_fov_region;
        if(local_fov_weight_type == 0){ // per angle
            for(k=0; k< num_local_fitting_region; k++){
                unsigned int (32) start_radius;
                unsigned int (32) end_radius;
                unsigned int (32) start_angle;
                unsigned int (32) end_angle;
                unsigned int (32) angle_delta;
                for(ang= start_angle; ang< end_angle; ang+= angle_delta){
                    unsigned int (32) start_radius_local_weight;
                    unsigned int (32) center_radius_local_weight;
                    unsigned int (32) end_radius_local_weight;
                }
            }
        }
        if(local_fov_weight_type == 1){ // per radius
            for(k=0; k< num_local_fitting_region; k++){
                unsigned int (32) start_radius;
                unsigned int (32) end_radius;
                unsigned int (32) start_angle;
                unsigned int (32) end_angle;
                unsigned int (32) radius_delta;
                for(j= start_radius; j< end_radius; j+= radius_delta){
                    unsigned int (32) start_angle_local_weight;
                    unsigned int (32) center_angle_local_weight;
                    unsigned int (32) end_angle_local_weight;
                }
            }
        }
        if(local_fov_weight_type == 2){
            for(j=0; j< num_local_fov_region; j++) {
```

TABLE 1-continued

```
        unsigned int(32) start_radius;
        unsigned int(32) end_radius;
        unsigned int(32) start_angle;
        unsigned int(32) end_angle;
        unsigned int(32) radius_delta;
        unsigned int(32) angle_delta;
        for(rad=start_radius; rad< end_radius;
        rad+=radius_delta) {
            for(ang=start_angle;    ang<    ang_radius;
ang+=angle_delta) {
                unsigned int(32) center_local_weight;
            }
        }
    }
        unsigned int (8) interpol_idx;
    }
    bit(16) reserved = 0;
    unsigned int(16) num_LSC_points;
    for(j=0; j< num_LSC_points; j++) {
        unsigned int (32) LSC_radius;
        unsigned int (32) LSC_gain_R;
        unsigned int (32) LSC_gain_G;
        unsigned int (32) LSC_gain_B;
    }
}
bit(24) reserved = 0;
unsigned int(8) num_deadzones;
for(i=0; i< num_deadzones; i++) {
    unsigned int(16) deadzone_left_horizontal_offset;
    unsigned int(16) deadzone_top_vertical_offset;
    unsigned int(16) deadzone_width;
    unsigned int(16) deadzone_height;
}
}
```

Referring to Table 1 above, the parameters for rearranging the overlapped region to the local fitting region may be defined as follows:

num_circular_images indicates the number of circular images in the coded picture of each sample to which the metadata applies. This is typically 2 or more, or may also be set to a non-zero value.

Figure 6A:
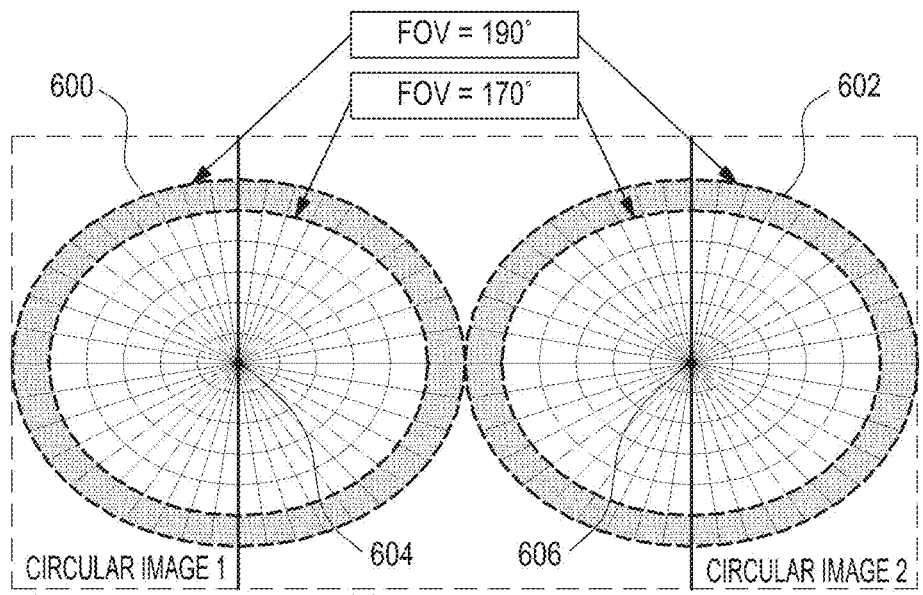
FIG. 6A is an illustration for describing num_circular_images, image_center_x, and image_center_y according to an embodiment of the present disclosure.

FIG. 6A is an illustration for describing num_circular_images, image_center_x, and image_center_y according to an embodiment of the present disclosure.

Referring to FIG. 6A, two images captured through a fisheye camera to configure VR content are configured as circular image 1 600 and circular image 2 602 projected on a planar surface. In this case, num_circular_images is thus 2.

image_center_x is the fixed point value, e.g., 16.16, which indicates the horizontal coordinate in luma samples at the center of the circular image in the encoded picture of each sample to which correction information is to apply. The horizontal coordinate of circular image 1 600 indicates the x coordinate of reference numeral 604, and the horizontal coordinate of circular image 2 602 indicates the x coordinate of reference numeral 606.

image_center_y is the fixed point value, e.g., 16.16, which indicates the vertical coordinate in luma samples at the center of the circular image in the encoded picture of each sample to which correction information is to apply. The vertical coordinate of circular image 1 600 indicates the y coordinate of reference numeral 604, and the vertical coordinate of circular image 2 602 indicates the y coordinate of reference numeral 606.

full_radius is the fixed point value, e.g. 16.16, which indicates the radius in the luma samples from the center of the circular image to the overall rounded image.

Figure 6B:
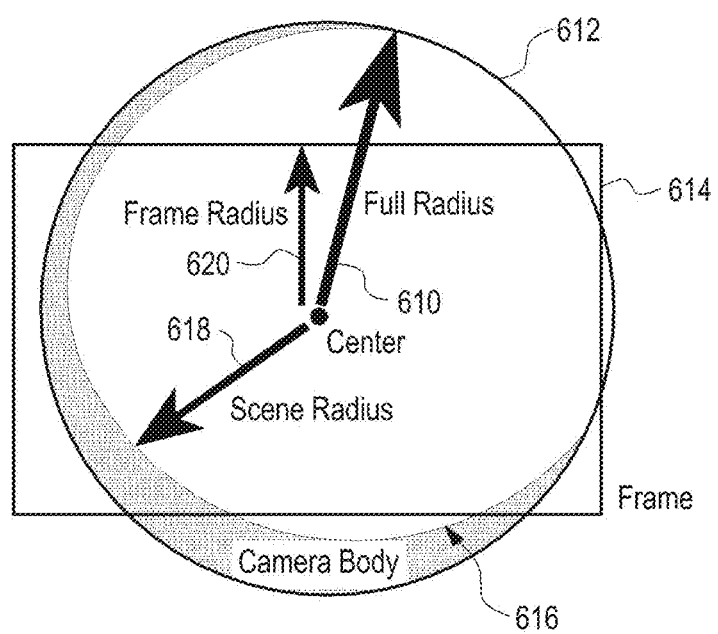
FIG. 6B is an illustration for describing radii according to an embodiment of the present disclosure.

FIG. 6B is an illustration for describing radii according to an embodiment of the present disclosure.

Referring to FIG. 6B, an ellipse 616 corresponds to the region of the lens mounted in the camera surrounded by the camera body. A frame outputted through the display unit of the camera is in a rectangular shape and is displayed with its portion cut away corresponding to the ellipse. In this case, the full_radius corresponds to reference numeral 610. For example, when the circular image is not perfectly circular but rather elliptical 616, the full_radius of the elliptical image may be defined with its horizontal radius and vertical radius both. Even when the circular image is cut by the frame 614 of the camera, the full radius value is theoretically defined as a value 610 for the non-cut image.

frame_radius is the fixed point value, e.g., 16.16, which indicates the radius in the luma samples from the center of the circular image in the frame to the boundary of the image. The full radius 610 may be defined with both a horizontal and vertical radius when the circular image is not perfectly circular or substantially elliptical. When the circular image is cut by, e.g., the frame 614 of the camera, the frame_radius value 620 is still defined as full_radius 610 for the non-cut image.

scene_radius is the fixed value, e.g., 16.16, which indicates the radius in the luma samples closest to the boundary region of the image from the center of the circular image where no obstacle is positioned between the camera body and the object. FIG. 6B is a view illustrating an example of a certain value of scene_radius according to an embodiment of the present disclosure.

Although Table 1 above briefly represents that scene_radius only indicates the radius of the closest one, the scene radius may be indicated in a different radius per angle, rather than in a single radius, to describe a region which is not influenced by any obstacle, as described in further detail below with reference to FIG. 6C.

Figure 6C:
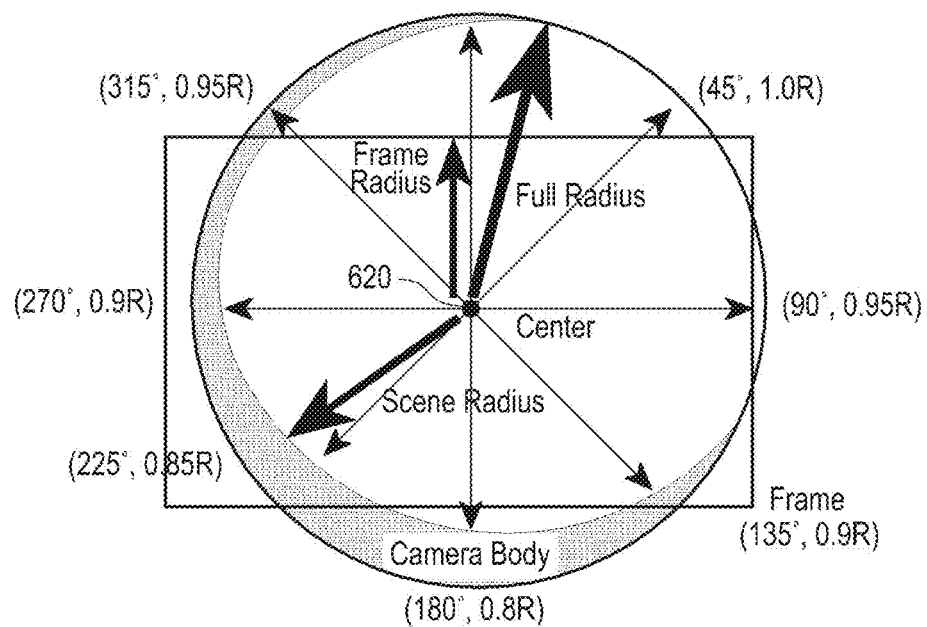
FIG. 6C is an illustration of a certain value of scene_radius according to an embodiment of the present disclosure.

FIG. 6C is an illustration of a certain value of scene_radius according to an embodiment of the present disclosure.

Referring to FIG. 6C, the scene_radius value of the sample corresponding to 90 degrees from the center 620 of the camera is referred to as the length to the end of the frame. In contrast, the scene_radius value of the sample corresponding to 270 degrees may be referred to as the length of the radius of the image corresponding to 270 degrees except for the radius corresponding to the camera body. For example, the scene_radius in the instant embodiment may be represented in four ways as follows:

$\{Cx, Cy, N, \{A_1, R_1\}, \ldots \{A_N, R_N\}\}$, where Cx and Cy indicate the coordinates of the center of the camera, i.e., reference numeral 620. N refers to the number of samples, and A and R, respectively, refer to the angle and radius of a corresponding sample.

$\{Cx, Cy, N, D, R_1, \ldots, R_N\}$, where D refers to being equi-interval between angles.

$\{N, \{A_1, R_1\}, \ldots \{A_N, R_N\}\}$ refers to the scene_radius of a corresponding sample using A and R from the center of the fixed image.

$\{N, D, R_1, \ldots, R_N\}$ indicates the scene_radius of a corresponding sample only with R of the sample from the center of the fixed image.

The above-described full_radius, frame_radius, and scene_radius may be classified as camera parameters. Generally, since the overall shape of the camera lens is not a gentle flat shape but rounded, lens shading may arise due to a difference in the amount of incident light. Accordingly, actual images captured by the camera are hard to seamlessly match using only the above-described parameters. Such lens shading may commonly be compensated in a scheme of representing the gain for compensating for shading from the center of the camera or lens to the outside as a function of radius. Thus, although the correction information according to an embodiment of the present disclosure is not included in Table 1 above, a parameter for compensating for the lens shading of camera may be added. Such lens shading compensation commonly applies before projecting images to the 2D plane surface.

The parameters for lens shading compensation in Table 1 above are defined as follows.

num_LSC_points refers to the number of lens shading compensation (LSC) points for the current circular image. Each LSB point has an LSC_gain_R, LSC_gain_G, LSC_gain_B, and LSC_radius.

LSC_radius indicates the distance between the center of the image and the current LSC point.

LSC_gain_R refers to the LSC gain for red.

LSC_gain_G refers to the LSC gain for green.

LSC_gain_B refers to the LSC gain for blue.

The lens shading compensation parameters according to an embodiment of the present disclosure may be represented in three types in total.

$\{N, \{R_1, G_1\}, \ldots, \{R_N, G_N\}\}$, where N is the number of samples, and G is the gain. That is, G may be referred to as the gain that is to be applied per sample radius.

$\{N, \{R_1, G_{R\_1}, G_{G\_1}, G_{B\_1}\}, \ldots, \{R_N, G_{R\_N}, G_{G\_N}, G_{B\_N}\}\}$, where $\{G_{R\_N}, G_{G\_N}, G_{B\_N}\}$ refers to each gain of RGB channel per radius of the sample.

$\{N, M, \{R_1, G_{1,2}, G_{1,3}, \ldots, G_{1,M}\}, \ldots, \{R_1, GN_{,1}, GN_{,2}, \ldots, G_{N,M}\}\}$, where M is the number of channels, and $\{G_{N,M}, G_{N,M}, \ldots, G_{N,M}\}$ refers to the gain of each of the M channels per sample radius.

As an expanded example of the lens shading compensation parameters, the radius interval of the concentric circles constituting the circular image may be designated as equi-interval $D_R$, and the gain may be designated per radius as follows.

Figure 6D:
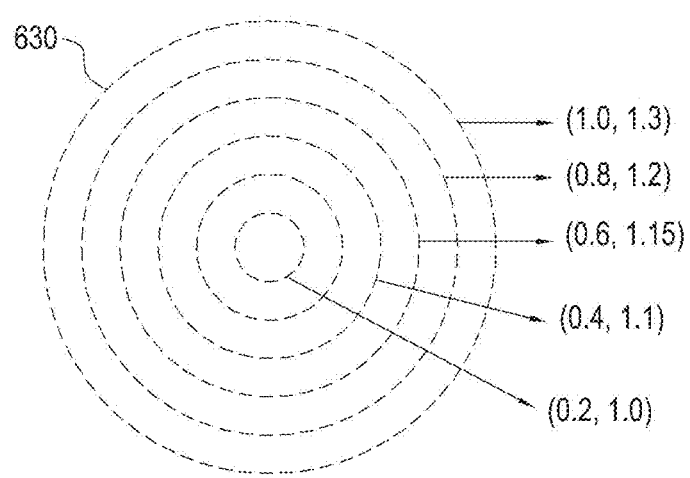
FIG. 6D is an illustration of applying a parameter to compensate for lens shading of a circular image according to an embodiment of the present disclosure.

$\{N, D_R, G_1, \ldots G_N\}$ $\{N, D_R, \{G_{R1}, G_{G1}, G_{B1}\}, \ldots \{G_{RN}, G_{GN}, G_{BN}\}\}$ $\{N, DR, M, \{G_{1,1}, G_{1,2}, \ldots, G_{1,M}\}, \ldots \{G_{N,1}, G_{N,2}, \ldots, G_{N,M}\}\}$ FIG. 6D is an illustration of applying a parameter to compensate for lens shading of a circular image according to an embodiment of the present disclosure.

Referring to FIG. 6D, for ease of description, the circular image 630 includes five concentric circles having an equi-interval (0.2) radius and has a high gain to compensate for the image that darkens from the center to the boundary.

image_rotation indicates the amount of rotation at angles of the circular image. For example, different video camera manufacturers may choose different coordinate systems or layouts for each captured image, and the image may be rotated at +/−90 degrees or +/−180 degrees or by other values. Referring to FIGS. 2A and 2B, one of the two images is an image rotated at +90 degrees, and the other is an image rotated at −90 degrees (e.g., +270 degrees).

image_flip indicates whether and how the image is flipped and whether reverse flipping needs to apply. For example, the image_flip value being 0 refers to the image not being flipped, the image_flip value being 1 refers to the image being flipped vertically, the image_flip value being 2 refers to the image being flipped horizontally, and the image_flip value being 3 refers to the image being flipped both vertically and horizontally.

image_scale_axis_angle, image_scale_x, and image_scale_y indicate whether and how the image is scaled along the axis, wherein the axis is defined by a single angle indicated by the image_scale_axis_angle value at angles, and the angle of 0 degrees indicates that the horizontal vector is perfectly horizontal and that the vertical vector is perfectly vertical, and image_scale_x and image_scale_y indicate scaling ratios in, e.g., the parallel and orthogonal direction of each corresponding axis.

field_of_view is the fixed point value, e.g., 16.16 which indicates the FoV of fisheye lenses at angles, where the normal value for a semi-circular fisheye lens is 180.0 degrees.

displayed_fov indicates the FOV corresponding to the image region of each fisheye camera image and rendered and displayed. For example, when the num_circular_images value is 2, the default of displayed_fov remains the same as 180 degrees. In contrast, displayed_fov may be varied depending on the properties of the lenses and content. For example, when the displayed_fov value of the image captured by the left-hand camera is 170, and the default layed_fov value of the image captured by the right-hand camera is 190, the stitching quality is rendered higher than when the images having a default of 180 degrees are stitched. The updated displayed_fov values may be brought in. The maximum gap between the default value, 180, and the value determined for displayed_fov is the same as overlapped_fov. Thus, the maximum displayed_fov value is 180+overlapped_fov, and the minimum displayed_fov value is 180-overlapped_fov.

overlapped_fov indicates the overlapped regions between multiple circular images. In other words, overlapped_fov indicates the overlapped region of the images arranged or stitched to configure a spherical image. Referring to FIG. 6A, overlapped_fov indicates the overlapped region between circular image 1 600 and circular image 2 602, i.e., the region where the FOV is indicated in shade between 170 degrees and 190 degrees. overlapped_fov may be shown in the form indicating the start FOV and the end FOV of the overlapped region according to an embodiment of the present disclosure.

Figure 7A:
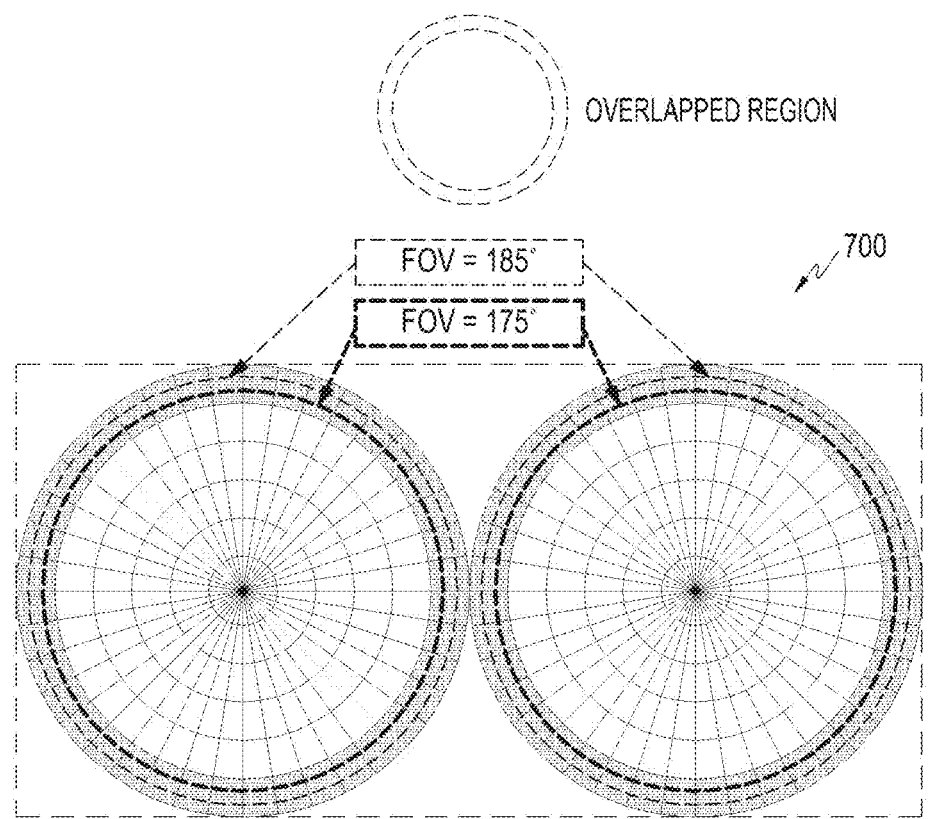
FIG. 7A is an illustration of indicating a value of overlapped_fov according to an embodiment of the present disclosure.

FIG. 7A is an illustration of indicating a value of overlapped_fov according to an embodiment of the present disclosure.

Referring to FIG. 7A, the overlapped_fov value may be indicated by some angles 700 between 170 degrees and 190 degrees which is an FOV range corresponding to the overlapped region depending on the arrangement of the cameras or lenses that have captured the two circular images. For example, it is shown that 175 degrees and 185 degrees are indicated as the overlapped_fov values.

Figure 7B:
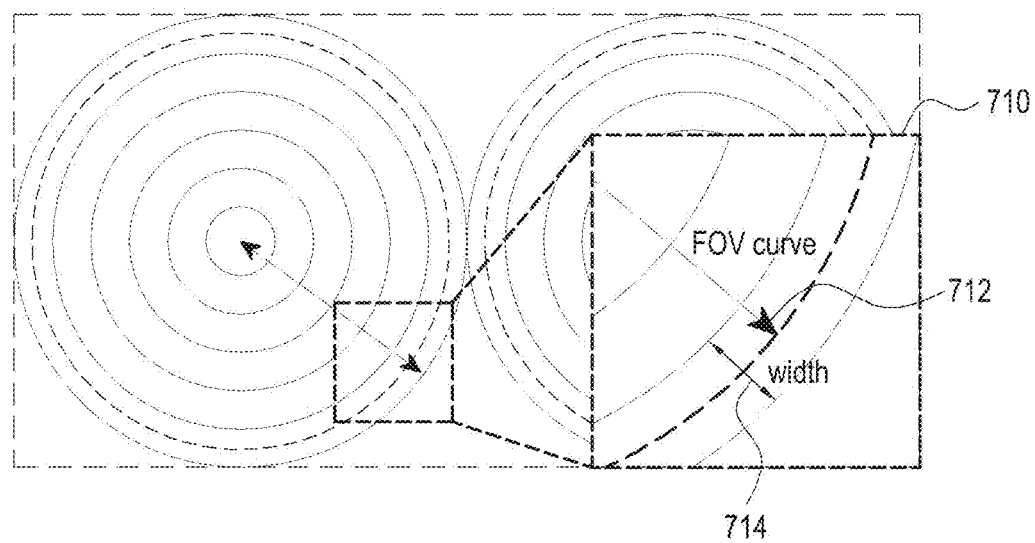
FIGS. 7B and 7C are illustrations of indicating a value of overlapped_fov according to an embodiment of the present disclosure.
Figure 7C:
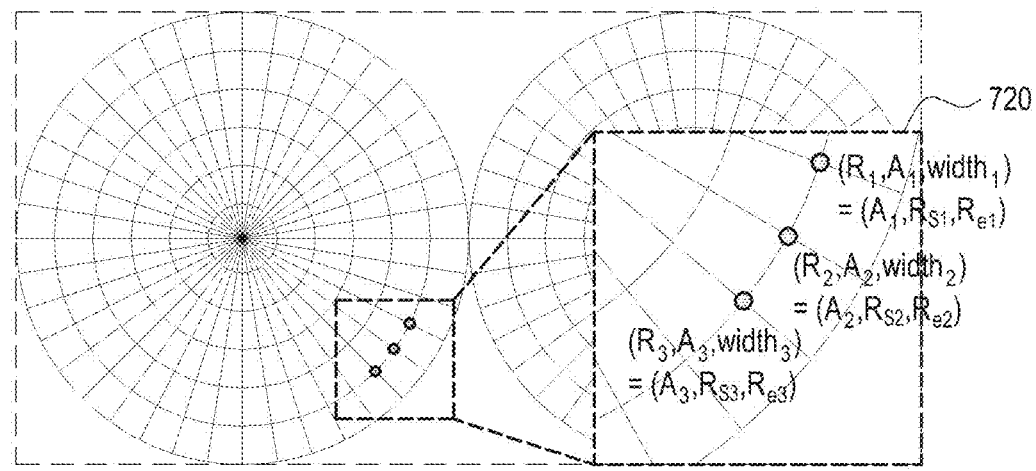

FIGS. 7B and 7C illustrations indicating a value of overlapped_fov according to an embodiment of the present disclosure.

Referring to FIGS. 7B and 7C, in FIG. 7B, as indicated by reference numeral 710, the overlapped_fov value may be, for example, only of the FOV curve 712, which is the central value of the FOV constituting the overlapped region, and the width 714 of the overlapped region. In FIG. 7C, as indicated by reference numeral 720, the overlapped_fov value may be the polar coordinates (radius and angle) and width of each of the points indicating the FOV curve. According to an embodiment of the present disclosure, in the overlapped_fov value, the start point and the end point of the overlapped region may be represented as polar coordinates, i.e., {(A1, Rs, Re), (A2, Rs, Re) . . . (An, Rs, Re)}.

According to an embodiment of the present disclosure, the parameters may represent the image using at least one of three angles as follows. —image_center_yaw is an integer indicating the yaw angle of the angles of the point where the central pixel of the circular image in the encoded picture of each sample is projected to the spherical surface.

image_center_pitch is an integer indicating the pitch angle of the angles of the point where the central pixel of the circular image in the encoded picture of each sample is projected to the spherical surface.

image_center_roll is an integer indicating the roll angle of the angles of the point where the central pixel of the circular image in the encoded picture of each sample is projected to the spherical surface.

num_compression_curve_points is an integer indicating a pair of compression_curve_x and compression_curve_y.

A list of the—compression_curve_x and compression_curve_y pairs refers to a geometrical compression curve of a relative circular image for a portion of a captured spherical scene. An array of the compression_curve_x values refers to normalized values of the radius that ranges from 0.0 at the center of the image to 1.0 degrees at the boundary of the image. An array of the compression_curve_y values refers to angles at degrees from the direction of camera view, where the range of the degrees is from 0.0 at the center of the image to 90.0 degrees at the boundary of the image according to the normalized axis for the fisheye lenses having the FoV of 180 degrees. Referring to FIG. 6A, compression_curve indicates how much region it is shown in the circular image on the plane surface for each FOV. The receiver may directly render a particular viewport from the circular image using such information on the compression curve.

According to an embodiment of the present disclosure, position and weight parameters for arranging the overlapped region to the local fitting region are as follows:

local_fov_weight_type indicates the representation type of FOV.

num_local_fov_region indicates the number of local fitting regions having different FOVs.

start_radius, end_radius, start_angle, and end_angle indicate local fitting/warping regions for varying the actual FOV partially displayed. In other words, according to an embodiment of the present disclosure, they are classified into parameters indicating the position of the local fitting region.

radius_delta refers to the delta value indicating a different FOV for each radius.

angle_delta refers to the delta value indicating a different FOV for each angle.

center_local_weight refers to the weight for the FoV at the center of the region specified by start_radius, end_radius, start_angle, and end_angle, where i is the angle index, and j is the radius index.

start_radius_local_weight refers to the weight of the local FOV in the region specified by start_radius.

end_radius_local_weight refers to the weight of the local FOV in the region specified by end_radius.

start_angle_local_weight refers to the weight of the local FOV in the region specified by start_angle.

end_angle_local_weight refers to the weight of the local FOV in the region specified by end_angle.

Besides the scheme of giving a weight for designating the local fitting region to the detected overlapped region as described above, the controller 402 may designate some regions where the overlapped region is distorted, blend the colors of the designated regions, and remove the distortion of the stitched images, according to an embodiment of the present disclosure. According to an embodiment of the present disclosure, applying a weight to the overlapped region may indicate both the local fitting region for the overlapped region and the region for blending. Although embodiments for indicating the position of the local fitting region have been described above for ease of description, the embodiments may also apply as embodiments for indicating the region for blending. In such case, the parameter of the weight applied for the local fitting region indicates color instead of FOV.

Hereinafter, the position of a local fitting region may be indicated according to the following embodiments.

According to an embodiment of the present disclosure, in the overlapped region, the position and degree of the overlap of the images may be varied by the properties of content corresponding to the image as well as by the position of the lens or camera that has captured the image.

Figure 7D:
FIG. 7D is an illustration of a local fitting region of an overlapped region according to an embodiment of the present disclosure.
Figure 7D:
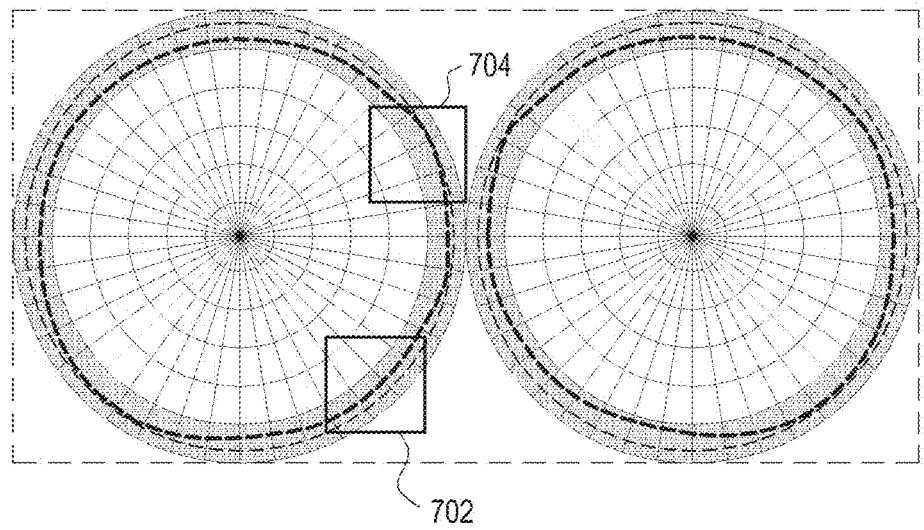

FIG. 7D is an illustration of a local fitting region of an overlapped region according to an embodiment of the present disclosure. The controller 402 may represent the region where a weight is to be applied to the overlapped region between the images shown in FIG. 7A by adjusting the overlapped_fov value to different values depending on the properties of the VR content as indicated at reference numerals 702 to 704 of FIG. 7D.

Figure 7E:
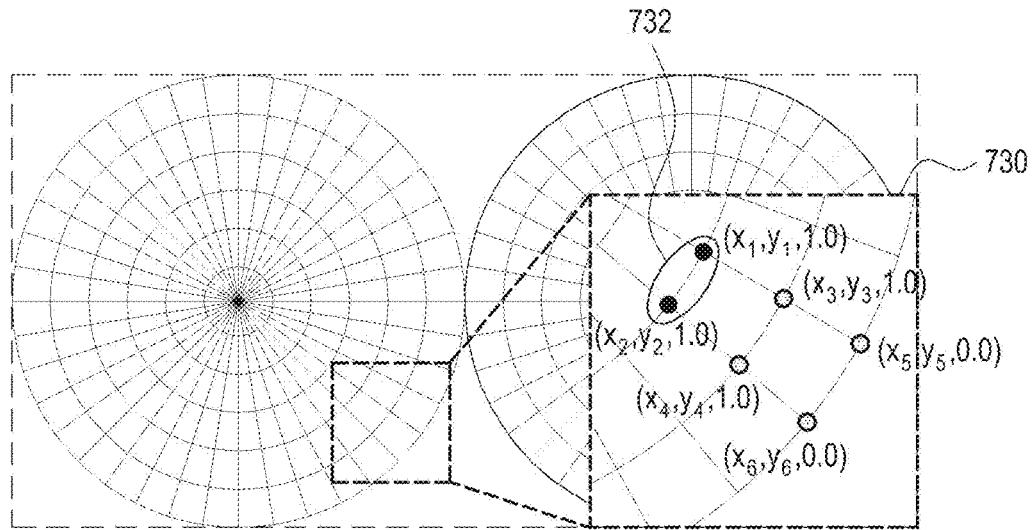
FIGS. 7E, 7F, and 7G are views illustrating an example of a local fitting region of an overlapped region according to an embodiment of the present disclosure.
Figure 7F:
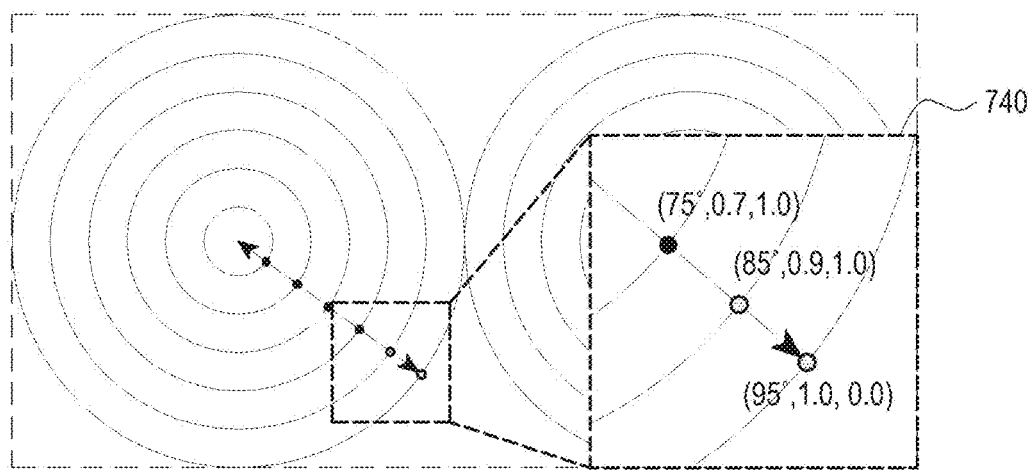
Figure 7G:
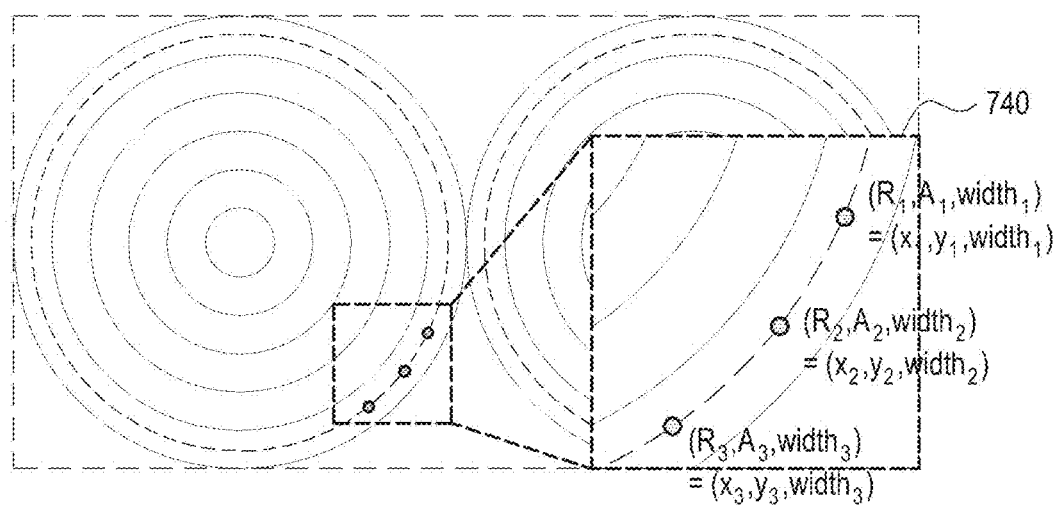

FIGS. 7E, 7F, and 7G are illustrations of a local fitting region of an overlapped region according to an embodiment of the present disclosure.

Referring to FIGS. 7E, 7F, and 7G; in FIG. 7E, as indicated by reference numeral 730, a weight field may be added to the (x,y) coordinates (corresponding to $\{x_3, y_3\}$, $\{x_4, y_4\}$ $\{x_5, y_5\}$, $\{x_6, y_6\}$ of FIG. 7C) of each of the points constituting the overlapped region and the (x,y) coordinates (corresponding to $\{x_1, y_1\}$, $\{x_2, y_2\}$ of reference numeral 732 of FIG. 7E) of each of the points in the local fitting where the overlapped region is to be rearranged. According to an embodiment of the present disclosure, it may be shown only with the (x,y) coordinates of each of the points constituting the local fitting region and the weight. For example, as indicated at reference numeral 730, it may be shown with the weight and (x,y) coordinates indicating the shade region corresponding to the overlapped region, i.e., $\{(x_3, y_3, 1.0), (x_4, y_4, 1.0), (x_5, y_5, 0.0), (x_6, y_6, 0.0) \ldots \}$. In FIG. 7F, the local fitting region may be shown with the FOV, radius, and weight of the concentric circles constituting the non-overlapped region and the overlapped region as an example. As shown at reference numeral 740, it may be shown with (75 degrees, 0.7, 1.0) indicating the non-overlapped region and (85 degrees, 09, 1.0) and (95 degrees, 1.0, 0.0) indicating the overlapped region. In other words, as the weight 0.0 applies to the end concentric circle of the overlapped region, and the weight 1.0 applies to the last concentric circle in the non-overlapped region and the start concentric circle of the overlapped region, the overlapped region is rearranged with 75 degrees, a radius of 0.7, and 85 degrees, a radius of 0.9. A weight may be applied to each of the start concentric circle {(85 degrees, 0.9) and the end concentric circle (95 degrees, 1.0)} of the overlapped region.

According to an embodiment of the present disclosure, a weight may be applied to the value indicating the overlapped region shown in FIG. 7B. In FIG. 7G, a weight may be indicated according to the radius, angle, and width indicating the overlapped region. Alternatively, a weight to be applied may be mapped according to the (x,y) coordinates and width or polar coordinates and width of each of the points indicating the FOV curve of the overlapped region according to FIG. 7F.

According to an embodiment of the present disclosure, the controller 402 may assign a different weight, i.e., the local FOV weight value, for each of the angles constituting the local fitting region so that the region corresponding to a particular angle of the concentric circle may be mapped to the overall image while being stretched or shrunken relatively using the position and weight parameters for arranging the overlapped region to the local fitting region as described above, and the controller 402 may include the assigned value in the metadata and send the same to the receiver. In this case, shrinking is a scheme for designating and shrinking a portion in the histogram corresponding to the pixels constituting the image.

Figure 8:
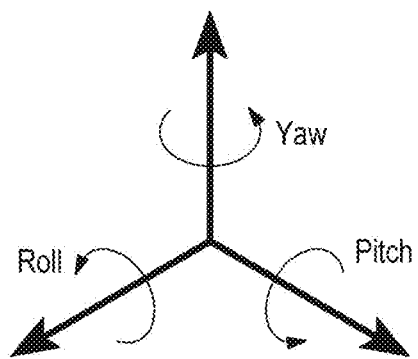
FIG. 8 is an illustration of roll, yaw, and pitch angle.

FIG. 8 is an illustration of roll, yaw, and pitch angle.

Referring to FIG. 8, roll, yaw, and pitch angles are defined on the x-axis, z-axis, and y-axis, respectively, as shown.

Figure 9:
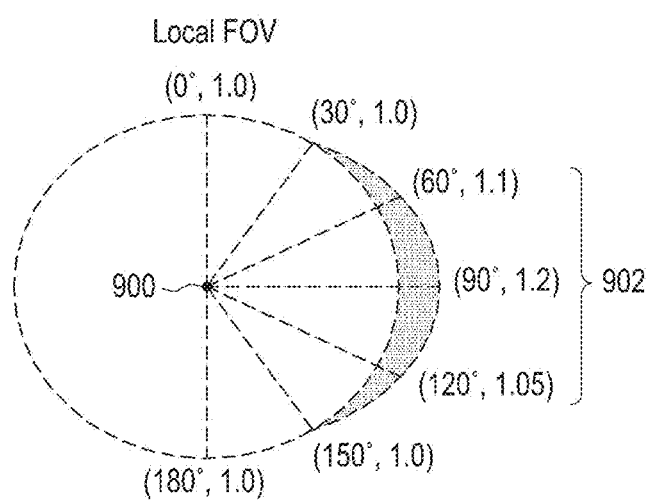
FIG. 9 is an illustration of applying a weight to place an overlapped region in a local fitting region according to an embodiment of the present disclosure.

FIG. 9 is an illustration of applying a weight to place an overlapped region in a local fitting region according to an embodiment of the present disclosure.

Referring to FIG. 9, correction parameters may be represented as, e.g., angle (local FOV) and weight (local FOV rate (LFR)) of the distorted region as detected. The weight is defined as the value indicating the mapping relationship between a particular point (a 3D point) of a 3D spherical image and a point (a 2D point) projected by the 3D point on a 2D planar surface. In this case, the angle may be referred to as an angle designated radially from the center of the image captured by the camera or lens. In FIG. 9, 0 degrees in the 12 o'clock direction is set to the start angle. However, such a representation is a mere example. The position or direction of the start angle may vary. Since the shaded region corresponds to the local fitting region in FIG. 9, a weight for expanding the edge of the circular image is set to indicate the same. When the local fitting region must be shrunken as compared with the edge of the circular image, a value smaller than 1 is set to the weight. Reference numeral 540 indicates an example in which a weight is set in 30-degree units within a range from 60 degrees to 150 degrees corresponding to the shaded region. In this range, the weight for an angle between the indicated angles may be rendered available by interpolating the weight of its adjacent angle. In other words, the parameters of Table 1 may add Interpol_idx that indicates the interpolation of the weight of an adjacent angle according to an embodiment of the present disclosure. For example, Interpol_idx may represent a certain method for interpolating a weight factor in a middle region within start_angle, end_angle, start_radius, and end_radius as shown in Table 2 below.

TABLE 2

| Interpol idx | Interpolation method |
| --- | --- |
| 0 | Nearest neighbor |
| 1 | Linear (or bi-linear) |
| 2~63 | reserved |

According to an embodiment of the present disclosure, the controller 402 may configure the position of the local fitting region only with the parameters indicating only the radius corresponding to the FOV, only with the parameters indicating the angle corresponding to the FOV, or only with the parameters indicating the radius and angle mode corresponding to the FOV, and the controller 402 may include the position of the local fitting region in the metadata. The parameters indicating the angle or radius may be set with the weights applied so that the radius or angle corresponding to the distorted region is mapped to the local fitting region. Specifically, the position of the local fitting region may be divided into the following embodiments.

N, $\{A_1, LFR_1\}, \{A2, LFR_2\}, \ldots, \{AN, LFR_N\}$, where A refers to the angle, N refers to the number of pieces of data, and LFR refers to the weight corresponding to the FOV of the angle.

N, $\{A_1, R_1\}, \{A_2, R_2\}, \ldots, \{A_N, R_N\}$, where R refers to the case in which the weight is applied to the radius in the 2D plane surface instead of the FOV.

N, D, $R_1, R_2, \ldots, R_N$, in which case the circular image is designated as having N angles in total with the inter-angle interval being D, and LFR is indicated per angle.

Rs, $R_E$, Rd, As, $A_E$, Ad, $\{LFR(R,A), \ldots\}$ in which case LFR between angle and radius is directly indicated. Rs may indicate the start radius or FOV, $R_E$ may indicate the end radius or FOV, Rd may indicate the radius or FOV interval, As and $A_E$, respectively, may indicate the start angle and end angle, Ad may indicate the inter-angle interval, and LFR(R,A) may indicate the LFR assigned to the radius and angle indicated as Rs, Re, Rd, As, Ae, Ad.

num_deadzones is an integer indicating the number of dead regions in the encoded picture of each sample to which the metadata is to be applied.

deadzone_left_horizontal_offset, deadzone_top_vertical_offset, deadzone_width, and deadzone_height are integers indicating the size and position of the deadzone rectangular region unable to use pixels. In this case, deadzone_left_horizontal_offset and deadzone_top_vertical_offset, respectively, indicate the horizontal and vertical coordinates in the luma samples of the upper and left corner of the deadzone in the encoded picture. deadzone_width and deadzone_height indicate the region and height in the luma samples of the deadzone. All pixels in the deadzone should be set to have the same pixel value, e.g., black, within the deadzone to store bits for playing video.

When parameters including correction information are configured through steps 411 to 414 as described above, the controller 402 may perform control to transmit the correction information through the transceiver 404. The correction information, e.g., the parameters, may be transmitted in the metadata of the VR content.

Then, the receiver may arrange the overlapped region to the local fitting region based on the parameters obtained from the metadata during the course of decoding the images constituting the VR content received from the transmitter, rendering a distortion-free 360-degree image.

In addition, according to an embodiment of the present disclosure, a lookup table may be used which stores, per FOV, the delta value, which is the weight corresponding to the disparity between the overlapped region and the local fitting region. The weights constituting of the lookup table may be determined as experimental values considering the properties of each lens in the camera unit 406 of the transmitter 400.

Figure 10A:
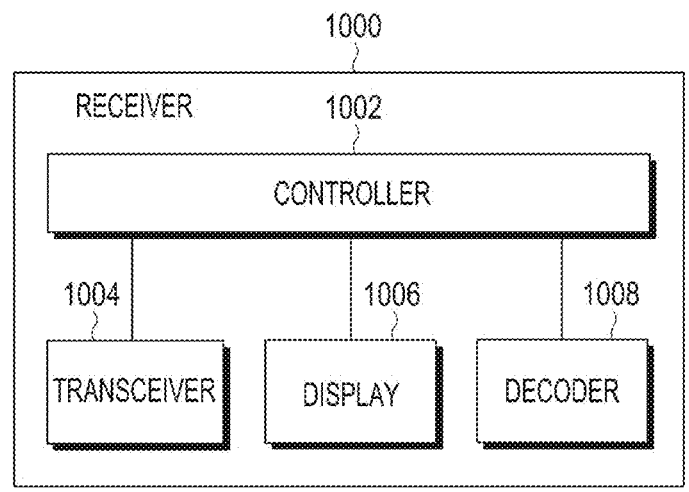
FIG. 10A is a block diagram of a receiver according to an embodiment of the present disclosure.
Figure 10B:
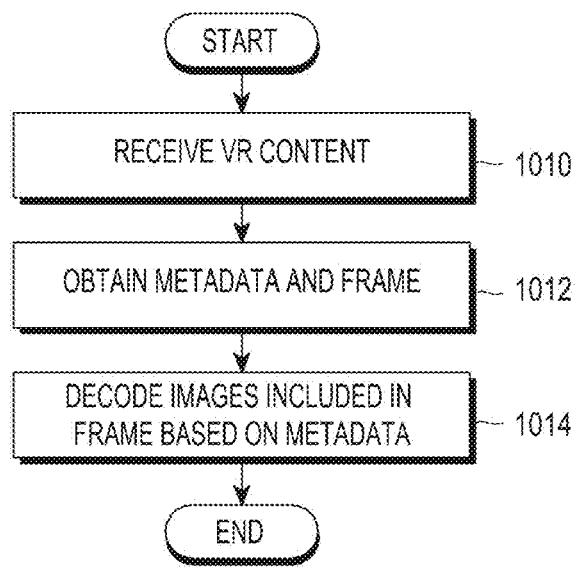
FIG. 10B is a flowchart of an operations on a receiver according to an embodiment of the present disclosure.

Described below with reference to FIGS. 10A and 10B are a method and apparatus for decoding and playing VR content received by the receiver, according to an embodiment of the present disclosure.

FIG. 10A is a block diagram of an embodiment of the present disclosure. Referring to FIG. 10A, a receiver 1000 may include a controller 1002, a transceiver 1004, a display 1006, and a decoder 1008.

FIG. 10B is a flowchart of an operations on a receive side according to an embodiment of the present disclosure.

Referring to FIG. 10B, the transceiver 1004 receives VR content from the transmitter in step 1010 In this case, the VR content received may be in the form of a file into which a frame and signaling information for the VR content are encapsulated as set forth above with reference to FIG. 3. Alternatively, the signaling information may be received separately from the encoded file.

In step 1012, the controller 1002 obtains the signaling information and the frame from the received file and delivers the signaling information and the frame to the decoder 1008. In step 1014, the decoder 1008 decodes the images included in the frame based on the signaling information according to an instruction from the controller 1002. Specifically, according to an embodiment of the present disclosure, the decoder 1008 may obtain circular images included in the frame. In this case, the circular images have the spherical images captured by the lenses or cameras in the transmitter projected and mapped onto the planar surface. First, the decoder 1008 may configure the image of the VR content by aligning or stitching the obtained circular images.

Figure 11A:
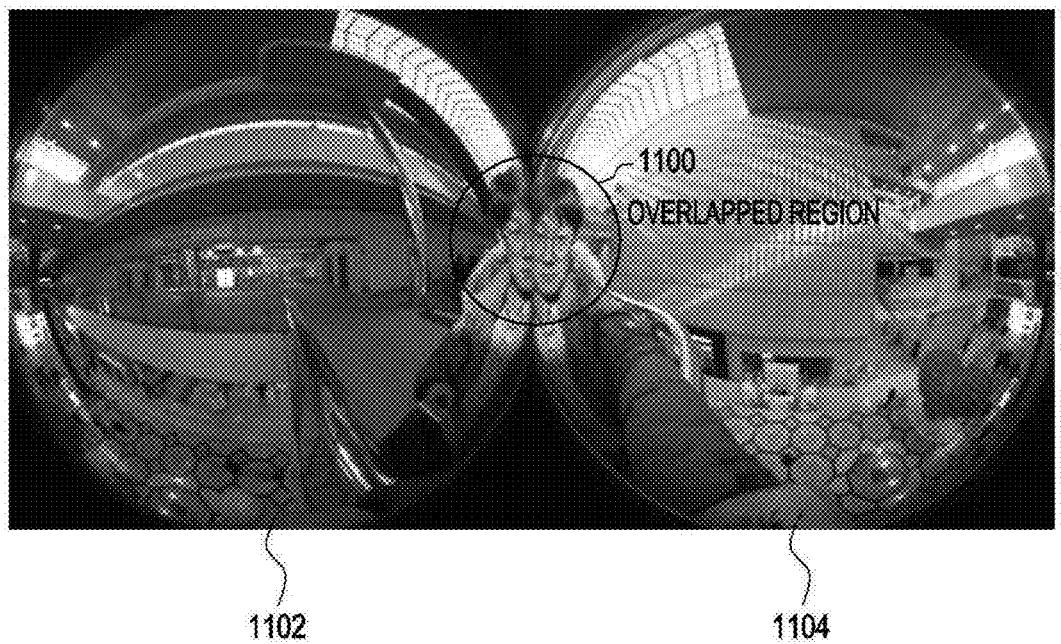
FIG. 11A is a photograph of decoding and stitching circular images received by a receiver from a transmitter according to an embodiment of the present disclosure.

FIG. 11A is a photograph of decoding and stitching circular images received by a receive side from a transmit side according to an embodiment of the present disclosure.

Referring to FIG. 11A, the objects, which are the same, have been distorted, failing to form symmetry in the overlapped region of the circular images.

According to an embodiment of the present disclosure, the controller 1002 may obtain the parameters indicating the local fitting region where the overlapped region 1100 of the stitched images is supposed to be actually positioned and placing the overlapped region 1100 in the local fitting region corresponding to the obtained parameters, compensating for the distortion. For example, the controller 1002 may determine the local fitting region where circular image 1 1102 and circular image 2 1102 should each be arranged using the displayed_fov value obtained from the signaling information. When the compression curve value obtained from the signaling information is used, the FOV may be replaced with the radius value in the actual image. In this case, an existing technique may be used to represent the FOV in angle units.

Figure 11B:
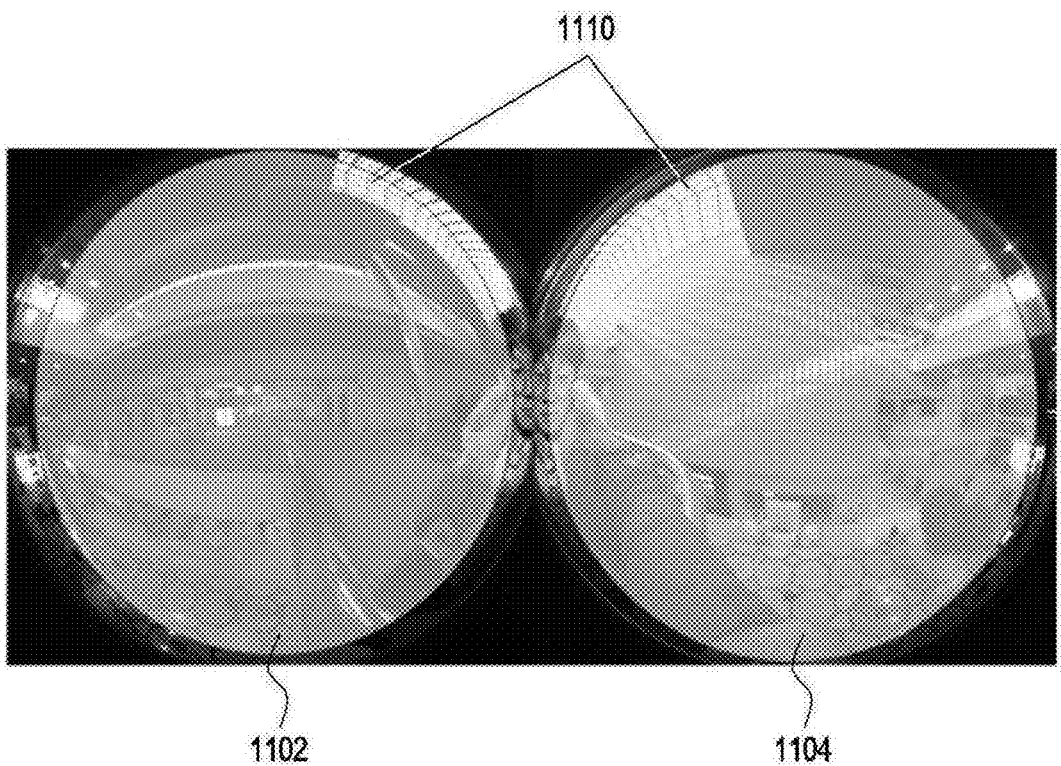
FIG. 11B is a photograph of a region of an image that is actually stitched and displayed when a compression curve is matched with a same radius value in all angular directions according to an embodiment of the present disclosure.

FIG. 11B is a photograph of an image that is actually stitched and displayed when a compression curve is matched with the same radius value in all angular directions according to an embodiment of the present disclosure.

Referring to FIG. 11B, the images 1102 and 1104 that are stitched are each shown in a circle as indicated by reference numeral 1110.

According to an embodiment of the present disclosure, upon obtaining the parameters indicating the FOV corresponding to the local fitting region where the overlapped region 1100 is supposed to be rearranged from the signaling information, the circular images 1102 and 1104 each may be displayed in the shape of an asymmetrical circle. In this case, the parameters indicating the FOV corresponding to the local fitting region, as described above, may be at least one of weights to be applied to the radii constituting the overlapped region 1100 (e.g., radius_delta, start_radius_local_weight, end_radius_local_weight) or weights to be applied to angle (e.g., start_angle local_weight, end_angle_local_weight and center_local_weight).

Figure 11C:
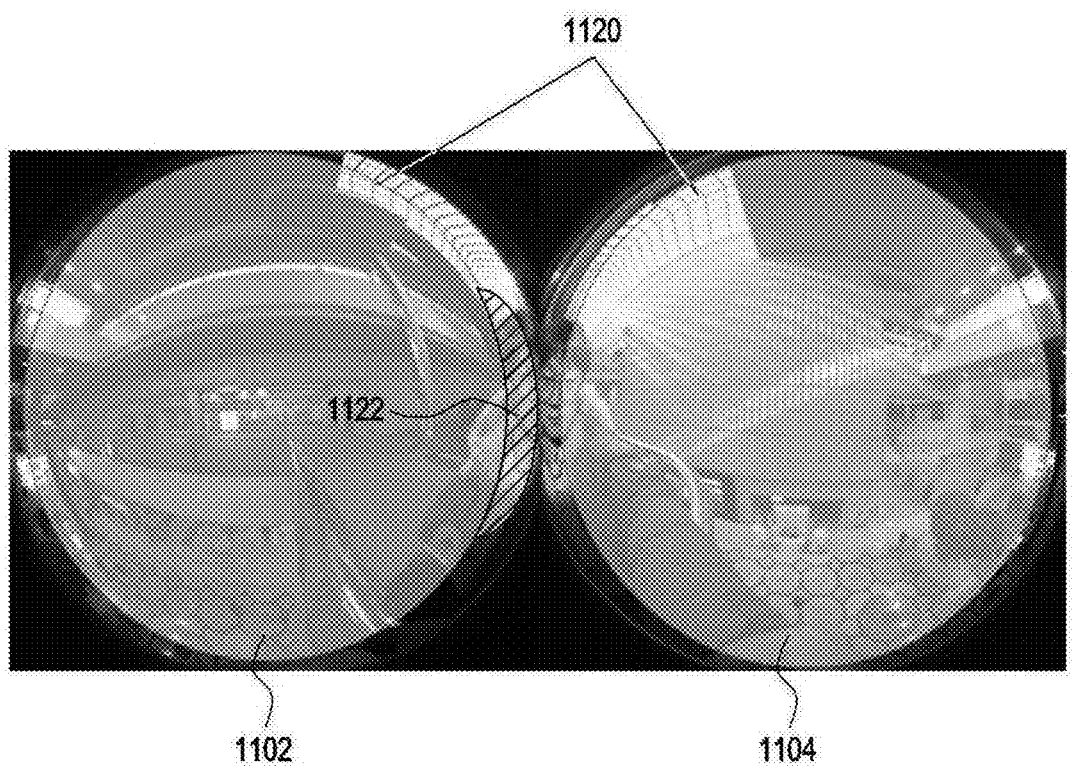
FIG. 11C is a photograph in which a circular image is displayed corresponding to a local fitting region according to an embodiment of the present disclosure.

FIG. 11C is a photograph in which a circular image is displayed corresponding to a local fitting region according to an embodiment of the present disclosure.

Referring to FIG. 11C, the weight is set so that a portion corresponding to the angle 1122 corresponding to the overlapped region of the circular image 1102 which is to be rearranged is positioned closer to the right-hand circular image 1104 as shown, thereby expanding the FOV corresponding to the angle 1122. Accordingly, the distorted image may be restored through the expanded FOV.

In addition, there is a need for a process of compensating for the lens shading of the captured circular image according to the physical properties of each lens that has captured the image.

FIGS. 12A, 12B, 12C, 12D, 12E, and 12F are photographs of a result of a process for compensating for lens shading according to an embodiment of the present disclosure.

Figure 12A:
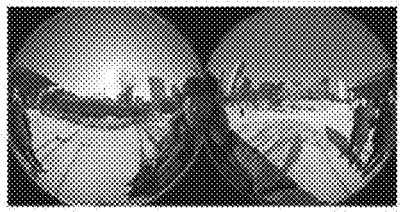
FIGS. 12A, 12B, 12C, 12D, 12E, and 12F are photographs of a process for compensating for lens shading according to an embodiment of the present disclosure.
Figure 12B:
Figure 12C:
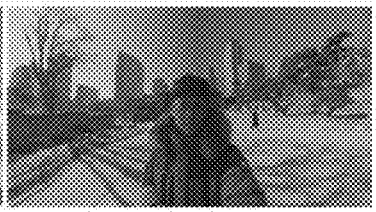
Figure 12D:
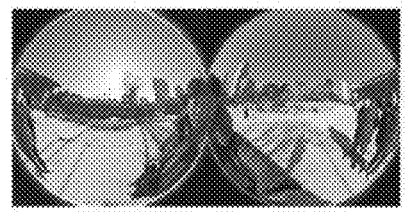
Figure 12E:

Referring to FIGS. 12A, 12B, 12C, 12D, 12E, and 12F, the boundary regions around the images captured by the fisheye cameras are shown dark by the nature of the lenses while the images are stitched. FIG. 12A is an original fisheye image, FIG. 12B is a stitched equirectanular projection image (ERP) image generated from the original fisheye image, and FIG. 12C is a rendered scene by using FIG. 12B. In addition, FIG. 12D is an original fisheye image generated by applying lens shading compensation method, FIG. 12E is a stitched equirectanular projection image (ERP) image generated from the FIG. 12D, FIG. 12E is shown as a rendered scene by using FIG. 12E. Thus, according to an embodiment of the present disclosure, the controller 1002 performs a post-process for compensating for the original fisheye images, which are stitched and displayed, using the lens shading compensation parameters (LSC parameters) as set forth above. For example, based on the LSC method, each red-green-blue (RGB) color component may be multiplied by a particular gain for compensation purposes. In this case, LSC_gain_R, LSC_gain_G, and LSC_gain_B are used which are obtained from the metadata.

Figure 12F:
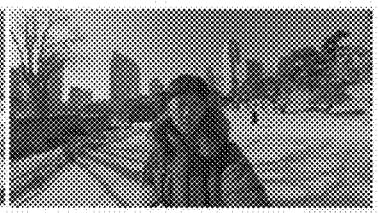

As a result, as shown in FIGS. 12D, 12E, and 12F, which shows lens shading-reflected images, more natural images than those of FIGS. 12A, 12B, and 12C may be rendered with the stitched region unnoticeable.

According to an embodiment of the present disclosure, upon obtaining the parameters indicating the region that needs to be blended in the overlapped region 1100 from the signaling information, the controller 1002 may compensate for the distortion in the stitched region by blending the colors of the region.

Figure 13A:
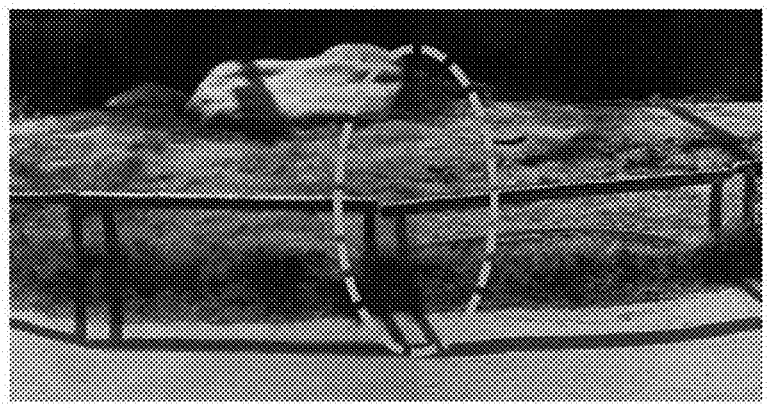
FIGS. 13A and 13B are photographs of applying a weight for blending on an overlapped region according to an embodiment of the present disclosure.
Figure 13B:
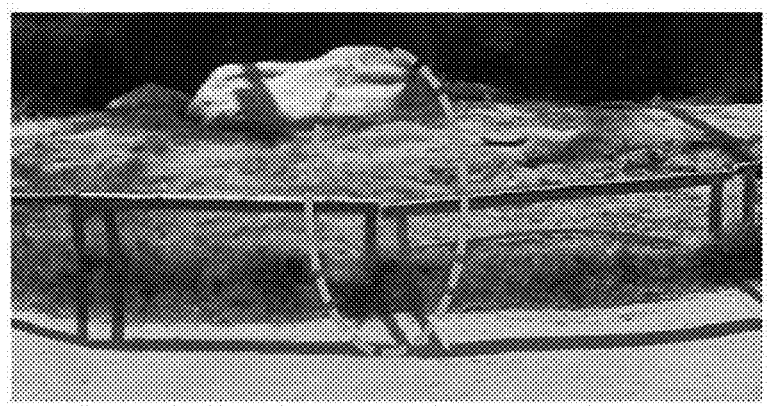

FIGS. 13A and 13B are photographs of applying a weight for blending on an overlapped region according to an embodiment of the present disclosure.

Referring to FIG. 13A, two images are rendered with the stitched border noticeable due to color differences between the edges of the stitched images.

Referring to FIG. 13B, the images are rendered with no stitched portion noticeable by blending the colors of the edges of the stitched images.

According to an embodiment of the present disclosure, a method for transmitting VR content by a device may include obtaining at least two images captured from a target; arranging the at least two images and projecting the two images on a plane surface to configure a 360-degree image corresponding to the VR content; detecting an overlapped region of the two images projected and generating rearrangement information about the overlapped region; and transmitting the rearrangement information and the at least two images.

Additionally, the rearrangement information may be transmitted in metadata of the VR content.

Additionally, the rearrangement information may include location information about the overlapped region and weight information for repositioning the overlapped region.

Additionally, the weight information may correspond to the location information about the overlapped region.

Additionally, the weight information may indicate a different value for each of at least two sub regions split from the overlapped region Additionally, the weight information may be set based on a distance between a camera capturing a reference region where the overlapped region is to be rearranged of the at least two images captured and object included in the overlapped region.

Additionally, the location information about the overlapped region may be configured based on at least one of angles and radii of concentric circles indicating a mapping relationship between the surface plane and a 3D model of a reference region where the overlapped region is to be rearranged of the at least two images captured.

According to an embodiment of the present disclosure, a method for receiving VR content may include receiving the VR content; obtaining at least two images captured from a target and rearrangement information from the VR content; and rendering a 360-degree image corresponding to the VR content by rearranging an overlapped region of the at least two images projected onto a plane surface based on the rearranged information.

Additionally, the rearrangement information may be transmitted in metadata of the VR content.

Additionally, the rearrangement information may include location information about the overlapped region and weight information for repositioning the overlapped region.

Additionally, the weight information may correspond to the location information about the overlapped region.

Additionally, the weight information may indicate a different value for each of at least two sub regions split from the overlapped region Additionally, the weight information may be set based on a distance between a camera capturing a reference region where the overlapped region is to be rearranged of the at least two images captured and object included in the overlapped region.

Additionally, the location information about the overlapped region may be configured based on at least one of angles and radii of concentric circles indicating a mapping relationship between the surface plane and a 3D model of a reference region where the overlapped region is to be rearranged of the at least two images captured.

According to an embodiment of the present disclosure, a device for transmitting VR content, may include a camera unit obtaining at least two images captured from a target; a controller arranging the at least two images and projecting the two images on a plane surface to configure a 360-degree image corresponding to the VR content, detecting an overlapped region of the two images projected, and generating rearrangement information about the overlapped region; and a transceiver transmitting the rearrangement information and the at least two images.

Additionally, the rearrangement information may be transmitted in metadata of the VR content.

Additionally, the rearrangement information may include location information about the overlapped region and weight information for repositioning the overlapped region.

Additionally, the weight information may correspond to the location information about the overlapped region.

Additionally, the weight information may indicate a different value for each of at least two sub regions split from the overlapped region Additionally, the weight information may be set based on a distance between a camera capturing a reference region where the overlapped region is to be rearranged of the at least two images captured and object included in the overlapped region.

Additionally, the location information about the overlapped region may be configured based on at least one of angles and radii of concentric circles indicating a mapping relationship between the surface plane and a 3D model of a reference region where the overlapped region is to be rearranged of the at least two images captured.

According to an embodiment of the present disclosure, a device receiving VR content, may include a transceiver receiving the VR content; a controller obtaining at least two images captured from a target and rearrangement information from the VR content; and a display rendering a 360-degree image corresponding to the VR content by rearranging an overlapped region of the at least two images projected onto a plane surface based on the rearranged information according to an instruction from the controller.

Additionally, the rearrangement information may be transmitted in metadata of the VR content.

Additionally, the rearrangement information may include location information about the overlapped region and weight information for repositioning the overlapped region.

Additionally, the weight information may correspond to the location information about the overlapped region.

Additionally, the weight information may indicate a different value for each of at least two sub regions split from the overlapped region Additionally, the weight information may be set based on a distance between a camera capturing a reference region where the overlapped region is to be rearranged of the at least two images captured and object included in the overlapped region.

Additionally, the location information about the overlapped region may be configured based on at least one of angles and radii of concentric circles indicating a mapping relationship between the surface plane and a 3D model of a reference region where the overlapped region is to be rearranged of the at least two images captured.

In addition, according to an embodiment of the present disclosure, the decoded images obtained may be stretched or warped, and the region corresponding to the view port may be rendered so that the images may be placed in a rectangle corresponding to the screen of the display 1006 of the receiver. The transmitter may likewise configure the parameters for the local fitting region where the images placed in the rectangle should be arranged and deliver the parameters to the receiver. The receiver may then rearrange the overlapped region to the local fitting region based on the parameters, thereby enabling the play of VR content free of distortion.

Particular aspects of the present disclosure may be implemented in computer-readable code on a non-transitory computer-readable recording medium. The non-transitory computer-readable recording medium is a data storage device that may store data readable by a computer system. Examples of a non-transitory computer-readable recording medium may include read only memories (ROMs), random access memories (RAMs), compact disk-read only memories (CD-ROMs), magnetic tapes, floppy disks, optical data storage devices, and carrier waves (such as data transmission over the Internet). The non-transitory computer-readable recording medium may be distributed by computer systems over a network, and accordingly, the computer readable code may be stored and executed in a distributed manner. Functional programs, code, and code segments to implement the present disclosure may be readily interpreted by skilled programmers in the art to which the present disclosure pertains.

The apparatuses and methods according to embodiments of the present disclosure may be implemented in hardware, software, or a combination of hardware and software. Such software may be recorded in volatile or non-volatile storage devices, such as ROMs, memories, such as RAMs, memory chips, memory devices, or integrated circuit devices, CDs, DVDs, magnetic disks, magnetic tapes, or other optical or magnetic storage devices while retained in non-transitory machine (e.g., computer)-readable storage media. The methods according to the present disclosure may be implemented by a computer or a portable terminal including a controller and a memory, and the memory may be an exemplary non-transitory machine-readable storage medium that may properly retain program(s) containing instructions for implementing the embodiments of the present disclosure.

Accordingly, the present disclosure encompasses a program containing code for implementing the device or method set forth in the present disclosure and a non-transitory machine (e.g., computer)-readable storage medium storing the program. The program may be electronically transferred via any media such as communication signals transmitted through a wired or wireless connection and the present disclosure properly includes the equivalents thereof.

The apparatuses according to an embodiment of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

Although specific embodiments of the present disclosure have been described above, various changes may be made thereto without departing from the scope of the present disclosure. Thus, the scope of the present disclosure is not intended to be limited to the above-described embodiments, but is defined by the appended claims and equivalents thereof.

What is claimed is:

1. A method for transmitting metadata related to a fisheye omnidirectional image by a device, the method comprising:
generating metadata related to a coded picture including at least two circular images captured by fisheye cameras; and
transmitting the generated metadata,
wherein if local field of view (FOV) parameters are present in the metadata, the metadata comprises:
information for specifying an FOV of a part of a circular image among the at least two circular images for displaying,
information for specifying an FOV of a part of the circular image which is overlapped with at least one circular image other than the circular image among the at least two circular images,
information for specifying a number of local fitting regions which have different FOV's, and
information for specifying each of the local fitting regions,
wherein the information for specifying each of the local fitting regions comprises:
information indicating a start radius of each of the local fitting regions,
information indicating an end radius of each of the local fitting regions,
information indicating a start angle of each of the local fitting regions, and
information indicating an end angle of each of the local fitting regions.

2. The method of claim 1, wherein if the FOV parameters are present in the metadata, the metadata further comprises:
information indicating a delta radius value for representing a different FOV for each radius,
information indicating a delta angle value for representing a different FOV for each angle,
information indicating a weighting value for an FOV of a region specified by the information for specifying each of the local fitting regions.

3. The method of claim 1, wherein if dead zone parameters are present in the metadata, the metadata further comprises:
information for specifying a number of dead zones in the coded picture, and
information for specifying a position and size of a deadzone rectangular area in which pixels are not usable, and
wherein the information for specifying the position and the size of the deadzone rectangular area comprises:
information for specifying a horizontal coordinate of an upper left corner of a dead zone in the coded picture, in luma samples,
information for specifying a vertical coordinate of the upper left corner of the dead zone in the coded picture, in the luma samples,
information for specifying a width of the dead zone in the coded picture, in the luma samples, and
information for specifying a height of the dead zone in the coded picture, in the luma samples.

4. The method of claim 1, wherein the metadata further comprises:
information for specifying a number of circular images in the coded picture,
information for specifying a horizontal coordinate, in luma samples, of a center of a circular image in the coded picture,
information for specifying a vertical coordinate, in luma samples, of the center of the circular image in the coded picture,
information for specifying a radius, in luma samples, form the center of the circular image to an edge of the circular image,
information for specifying a radius, in luma samples, form the center of the circular image to a closest edge of an area in the circular image where there are no obstructions from a camera body, and
information for specifying an FOV of a fisheye lens corresponding to the circular image.

5. The method of claim 1, wherein if image flipping region information is present in the metadata, the metadata further comprises information for specifying whether and how a circular image has been flipped and a reverse flipping operation needs to be applied, and
wherein if image scale and lens shading compensation camera intrinsic parameters are present in the metadata, the metadata further comprises information for specifying whether and how the circular image has been scaled along an axis.

6. A method for processing data related to a fisheye omnidirectional image, the method comprising:
  receiving metadata related to a coded picture including at least two circular images captured by fisheye cameras; and
  processing data related to the fisheye omnidirectional image based on the received metadata,
  wherein if local field of view (FOV) parameters are present in the metadata, the metadata comprises:
  information for specifying an FOV of a part of a circular image among the at least two circular images for displaying,
  information for specifying an FOV of a part of the circular image which is overlapped with at least one circular image other than the circular image among the at least two circular images,
  information for specifying a number of local fitting regions which have different FOV's, and
  information for specifying each of the local fitting regions,
  wherein the information for specifying each of the local fitting regions comprises:
  information indicating a start radius of each of the local fitting regions,
  information indicating an end radius of each of the local fitting regions,
  information indicating a start angle of each of the local fitting regions, and
  information indicating an end angle of each of the local fitting regions.

7. The method of claim 6, wherein if the local FOV parameters are present in the metadata, the metadata further comprises:
  information indicating a delta radius value for representing a different FOV for each radius,
  information indicating a delta angle value for representing a different FOV for each angle,
  information indicating a weighting value for an FOV of a region specified by the information for specifying each of the local fitting regions.

8. The method of claim 6, wherein if dead zone parameters are present in the metadata, the metadata further comprises:
  information for specifying a number of dead zones in the coded picture, and
  information for specifying a position and size of a deadzone rectangular area in which pixels are not usable, and
  wherein the information for specifying the position and the size of the deadzone rectangular area comprises:
  information for specifying a horizontal coordinate of an upper left corner of a dead zone in the coded picture, in luma samples,
  information for specifying a vertical coordinate of the upper left corner of the dead zone in the coded picture, in the luma samples,
  information for specifying a width of the dead zone in the coded picture, in the luma samples, and
  information for specifying a height of the dead zone in the coded picture, in the luma samples.

9. The method of claim 6, wherein the metadata further comprises:
  information for specifying a number of circular images in the coded picture,
  information for specifying a horizontal coordinate, in luma samples, of a center of a circular image in the coded picture,
  information for specifying a vertical coordinate, in luma samples, of the center of the circular image in the coded picture,
  information for specifying a radius, in luma samples, form the center of the circular image to an edge of the circular image,
  information for specifying a radius, in luma samples, form the center of the circular image to a closest edge of an area in the circular image where there are no obstructions from a camera body, and
  information for specifying an FOV of a fisheye lens corresponding to the circular image.

10. The method of claim 6, wherein if image flipping region information is present in the metadata, the metadata further comprises information for specifying whether and how a circular image has been flipped and a reverse flipping operation needs to be applied, and
  wherein if image scale and lens shading compensation camera intrinsic parameters are present in the metadata, the metadata further comprises information for specifying whether and how the circular image has been scaled along an axis.

11. A device for transmitting metadata related to a fisheye omnidirectional image, comprising:
  a controller configured to generate metadata related to obtaining a coded picture including at least two circular images captured by fisheye cameras; and
  a transceiver configured to transmit the generated metadata,
  wherein if local field of view (FOV) parameters are present in the metadata, the metadata comprises:
  information for specifying an FOV of a part of a circular image among the at least two circular images for displaying,
  information for specifying an FOV of a part of the circular image which is overlapped with at least one circular image other than the circular image among the at least two circular images,
  information for specifying a number of local fitting regions which have different FOV's, and
  information for specifying each of the local fitting regions,
  wherein the information for specifying each of the local fitting regions comprises:
  information indicating a start radius of each of the local fitting regions,
  information indicating an end radius of each of the local fitting regions,
  information indicating a start angle of each of the local fitting regions, and
  information indicating an end angle of each of the local fitting regions.

12. The device of claim 11, wherein if the local FOV parameters are present in the metadata, the metadata further comprises:
  information indicating a delta radius value for representing a different FOV for each radius,
  information indicating a delta angle value for representing a different FOV for each angle,
  information indicating a weighting value for an FOV of a region specified by the information for specifying each of the local fitting regions.

13. The device of claim 11, wherein if dead zone parameters are present in the metadata, the metadata further comprises:
information for specifying a number of dead zones in the coded picture, and
information for specifying a position and size of a deadzone rectangular area in which pixels are not usable, and
wherein the information for specifying the position and the size of the deadzone rectangular area comprises:
information for specifying a horizontal coordinate of an upper left corner of a dead zone in the coded picture, in luma samples,
information for specifying a vertical coordinate of the upper left corner of the dead zone in the coded picture, in the luma samples,
information for specifying a width of the dead zone in the coded picture, in the luma samples, and
information for specifying a height of the dead zone in the coded picture, in the luma samples.

14. The device of claim 11, wherein the metadata further comprises:
information for specifying a number of circular images in the coded picture,
information for specifying a horizontal coordinate, in luma samples, of a center of a circular image in the coded picture,
information for specifying a vertical coordinate, in luma samples, of the center of the circular image in the coded picture,
information for specifying a radius, in luma samples, form the center of the circular image to an edge of the circular image,
information for specifying a radius, in luma samples, form the center of the circular image to a closest edge of an area in the circular image where there are no obstructions from a camera body, and
information for specifying an FOV of a fisheye lens corresponding to the circular image.

15. The device of claim 11, wherein if image flipping region information is present in the metadata, the metadata further comprises information for specifying whether and how a circular image has been flipped and a reverse flipping operation needs to be applied, and
wherein if image scale and lens shading compensation camera intrinsic parameters are present in the metadata, the metadata further comprises information for specifying whether and how the circular image has been scaled along an axis.

16. A device for processing data related to a fisheye omnidirectional image, comprising:
a transceiver configured to receive metadata related to a coded picture including at least two circular images captured by fisheye cameras; and
a controller configured to process data related to the fisheye omnidirectional image based on the received metadata,
wherein if local field of view (FOV) parameters are present in the metadata, the metadata comprises:
information for specifying an FOV of a part of a circular image among the at least two circular images for displaying,
information for specifying an FOV of a part of the circular image which is overlapped with at least one circular image other than the circular image among the at least two circular images,
information for specifying a number of local fitting regions which have different FOV's, and
information for specifying each of the local fitting regions,
wherein the information for specifying each of the local fitting regions comprises:
information indicating a start radius of each of the local fitting regions,
information indicating an end radius of each of the local fitting regions,
information indicating a start angle of each of the local fitting regions, and
information indicating an end angle of each of the local fitting regions.

17. The device of claim 16, wherein if the local FOV parameters are present in the metadata, the metadata further comprises:
information indicating a delta radius value for representing a different FOV for each radius,
information indicating a delta angle value for representing a different FOV for each angle,
information indicating a weighting value for an FOV of a region specified by the information for specifying each of the local fitting regions.

18. The device of claim 16, wherein if dead zone parameters are present in the metadata, the metadata further comprises:
information for specifying a number of dead zones in the coded picture, and
information for specifying a position and size of a deadzone rectangular area in which pixels are not usable, and
wherein the information for specifying the position and the size of the deadzone rectangular area comprises:
information for specifying a horizontal coordinate of an upper left corner of a dead zone in the coded picture, in luma samples,
information for specifying a vertical coordinate of the upper left corner of the dead zone in the coded picture, in the luma samples,
information for specifying a width of the dead zone in the coded picture, in the luma samples, and
information for specifying a height of the dead zone in the coded picture, in the luma samples.

19. The device of claim 16, wherein the metadata further comprises:
information for specifying a number of circular images in the coded picture,
information for specifying a horizontal coordinate, in luma samples, of a center of a circular image in the coded picture,
information for specifying a vertical coordinate, in luma samples, of the center of the circular image in the coded picture,
information for specifying a radius, in luma samples, form the center of the circular image to an edge of the circular image,
information for specifying a radius, in luma samples, form the center of the circular image to a closest edge of an area in the circular image where there are no obstructions from a camera body, and
information for specifying an FOV of a fisheye lens corresponding to the circular image.

20. The device of claim 16, wherein if image flipping region information is present in the metadata, the metadata further comprises information for specifying whether and how a circular image has been flipped and a reverse flipping operation needs to be applied, and wherein if image scale and lens shading compensation camera intrinsic parameters are present in the metadata, the metadata further comprises information for specifying whether and how the circular image has been scaled along an axis.

* * * * *